United States Patent [19]
Nambu

[11] Patent Number: 5,101,954
[45] Date of Patent: Apr. 7, 1992

[54] ARTICLE CONVEYING METHOD AND APPARATUS

[75] Inventor: Kunio Nambu, Kyoto, Japan

[73] Assignee: Nambu Electric Co., Ltd., Kyoto, Japan

[21] Appl. No.: 627,041

[22] Filed: Dec. 13, 1990

[30] Foreign Application Priority Data

Dec. 15, 1989 [JP] Japan .................. 1-326589
Jul. 11, 1990 [JP] Japan .................. 2-183418
Jul. 27, 1990 [JP] Japan .................. 2-200780
Jul. 31, 1990 [JP] Japan .................. 2-204269

[51] Int. Cl.$^5$ ............................................. B65G 47/46
[52] U.S. Cl. .................................. 198/365; 198/470.1; 198/803.9; 209/510; 209/912
[58] Field of Search ............. 198/474.1, 476.1, 477.1, 198/470.1, 365, 370, 803.9; 209/510, 912

[56] References Cited

U.S. PATENT DOCUMENTS

| | | | |
|---|---|---|---|
| 2,888,131 | 5/1959 | Allen | 198/803.9 |
| 2,918,164 | 12/1959 | Austin et al. | 198/370 |
| 3,469,671 | 9/1969 | Mencacci et al. | 198/418.2 |
| 4,396,109 | 8/1983 | Nambu . | |
| 4,462,201 | 7/1984 | Nambu . | |

FOREIGN PATENT DOCUMENTS 56-127513 10/1981 Japan .
57-13011 1/1982 Japan .
61-287622 12/1986 Japan .

Primary Examiner—Joseph E. Valenza
Attorney, Agent, or Firm—Cushman, Darby & Cushman

[57] ABSTRACT

An article conveying method in which an article are held by a plurality of carriage provided on an endless recirculating distributing conveyer and discharged at a discharge station positioned in the passageway of the conveyer, each carriage including a discharge unit for discharging an article at the discharge station and a holding unit for holding another article until the discharge unit discharges the article, comprising the steps of: shifting the another article held by the holding unit to the discharge unit during the time when the carriage concerned is carried to the next discharge station after the discharge unit discharges the article at the first discharge station to discharge the another article at the next discharge station.

10 Claims, 25 Drawing Sheets

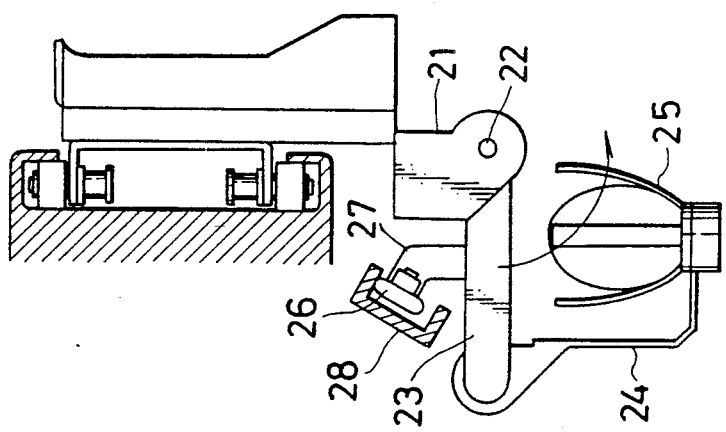
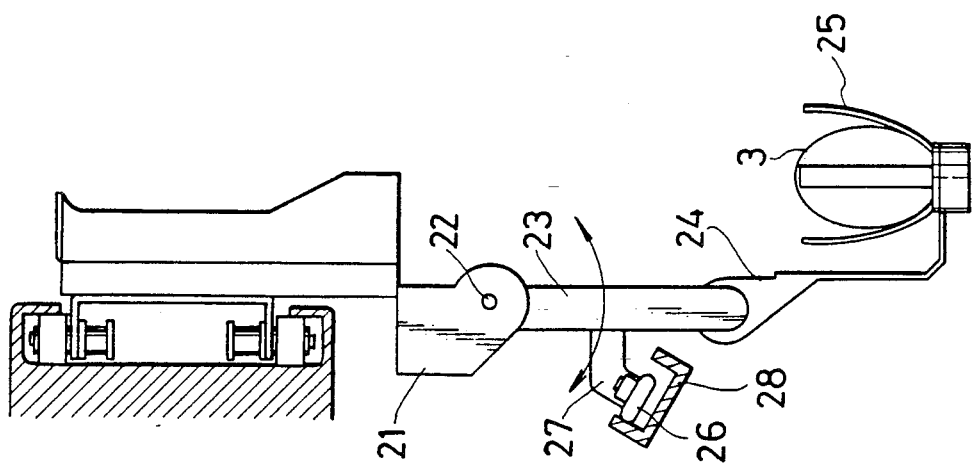
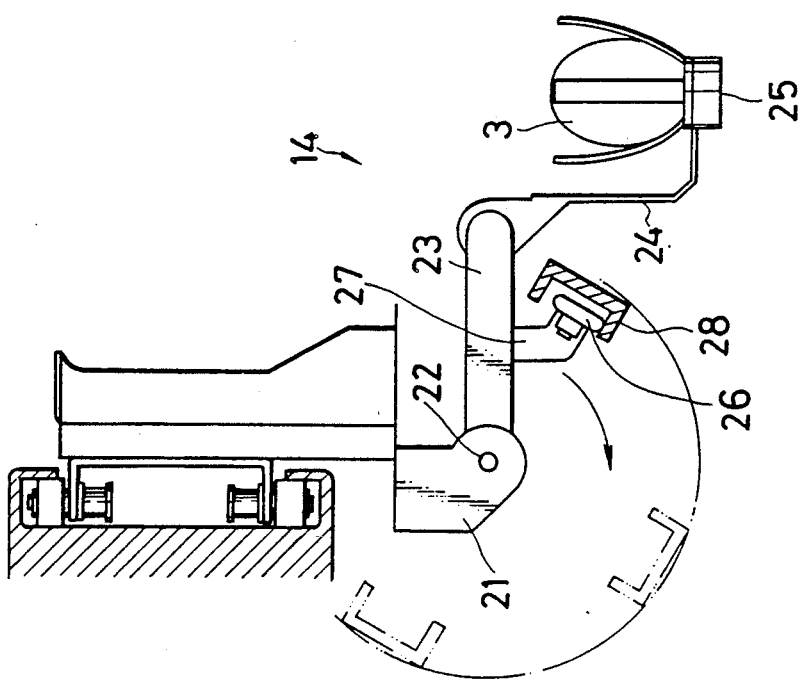

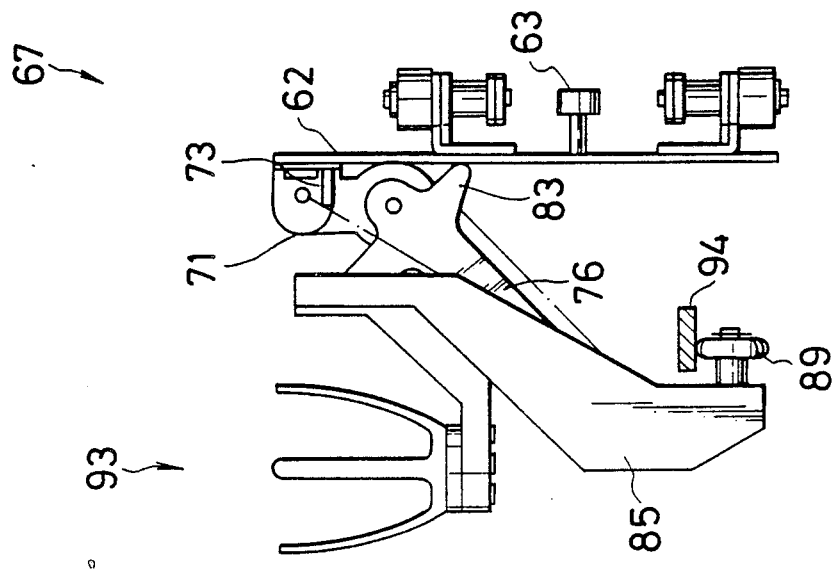
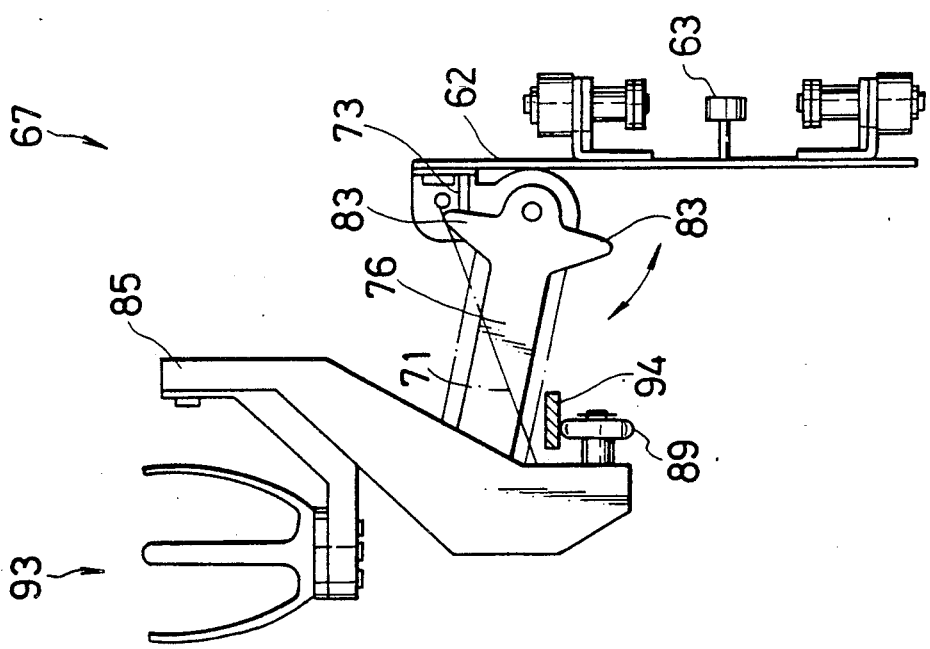

ARTICLE CONVEYING METHOD AND APPARATUS

BACKGROUND OF THE INVENTION

The present invention relates to an article conveying method and apparatus in which carriages which hold articles are carried to a discharge station during which time articles held in holding units are shifted to discharge units and discharged.

There are many commercially available devices which select and package articles held in an endless recirculating distributing conveyer in accordance with weight. For example, an egg selecting and packaging device measures the weight of eggs, transfers to the distributing conveyer, and causes same to carry them away one by one in a single row. However, since these devices are intended only to distribute eggs, they function only as such. Once an egg is discharged at the discharge station, the conveyer circulates around its passageway to an egg supply position to handle the next egg.

According to this conventional method, one article is transferred to the distributing conveyer at the transfer position and carried away, so that its processing capability is limited.

In such selecting and packaging devices of this type, a multiplicity of grips are attached to the endless chain to circulate, grip selected articles sequentially at a first position and discharge them sequentially at a second position and drop them into a packaging container sequentially (see U.S. Pat. No. 4,462,201). Each grip includes a grip member formed integral with an end of an arm and a second grip member to push an article against the former grip member. The article is discharged when the second grip member is opened.

If the distributing conveyer of the endless chain is moved at high speed to improve the capability of handling articles, there is the problem that the positions where the articles fall vary due to the directions of the articles gripped along the grip members. There is another problem that when an article is discharged, the second grip member bounds to make contact with the falling article to change the expected position where the article falls. At the position where the article is discharged, the packaging container is beforehand placed. If the article cannot fall on a predetermined position in the container, it would hit on another article already accommodated in the container or hit on a place which is different from the place where the article is to be held in the container to thereby damage or break the article. Thus, the handling capability is limited.

It is an object of the present invention to provide an article handling method and apparatus for conveying a plurality of articles simultaneously and shifting them in the passageway of article conveyance instead of receiving and handling a single article.

It is an object of the present invention to provide an article conveying method in which articles are held by a carriage provided on an endless recirculating distributing conveyer and discharged at a discharge station positioned in the passageway of the conveyer, the carriage including a discharge unit for discharging an article at the discharge station and a holding unit for holding another article until the discharge unit discharges the article, comprising the steps of: shifting the another article held by the holding unit to the discharge unit during the time when the carriage is carried to the next discharge station after the discharge unit discharges the article at the first discharge station to discharge the another article at the next discharge station.

It is another object of the present invention to provide a carriage comprising: discharge unit provided swingably on a plate fixed to a recirculating chain and having a gripping unit at an end; and a holding unit having an arm turnable from a first position to a second position along a guide passageway, the arm being pivoted at one end to a lower end of the plate, a holding element provided at the other end of the arm such that an opening in the holding element faces upwardly at all times, whereby when the holding element of the holding unit moves to a gripping position, the discharge unit turns downward to causes the gripping unit to grip an article held by the holding element of the holding unit.

In more detail, it is an object of the present invention to provide an article conveying apparatus, comprising: a first and a second feed conveyer for feeding articles; a distributing conveyer having a carriage including a plurality of discharge units disposed at equal intervals on the side of an endless recirculating chain disposed before the first feed conveyer so as to traverse the same, the discharge unit having a gripping unit for gripping an article at an end of a vertically movable arm, and a holding unit provided below each discharge unit and having a holding element at an end of an arm movable to one and the other side of a guide passageway such that an opening in the holding element faces upwardly at all times; and a plurality of packaging conveyers provided halfway through the passageway of the distributing conveyer: and an article conveying apparatus comprising: a recirculating conveyer provided on the side of an endless recirculating chain disposed before the second feed conveyer so as to traverse same and overlapping with the passageway of the distributing conveyer, the recirculating conveyer including an arm a portion of which is movable vertically and has a holding unit; and a plurality of packaging conveyers provided halfway through the passageway of the distributing conveyer.

It is a further object of the present invention to provide, in a selector for selecting articles held by a distributing conveyer halfway through the passageway of the distributing conveyer according to the physical characteristic of the articles, an article conveying apparatus comprising: a first recirculating conveyer for conveying a first article fed by a feed unit; a second recirculating conveyer for conveying a second article fed by a second feed unit; and an endless recirculating distributing conveyer having a portion parallel and adjacent to the respective passageways of the first and second recirculating conveyers, the distributing conveyer including a carriage which includes a discharge unit for discharging the first and second articles and a holding unit for holding the first article until the discharge unit discharges the second article.

It is another object of the present invention to provide an article conveying apparatus comprising means for shifting the first article held by the holding unit to the discharge unit after the discharge unit discharges the second article at a first discharge station during the time when the carriage is conveyed to the next discharge station in order to discharge the first article at the next discharge station.

It is an object of the present invention to provide an article conveying apparatus comprising a carriage including means for discharging a first article at a discharge station and means for holding a second article until the discharging means discharges the first article, the discharge station being positioned in a passageway of an endless recirculating distributing conveyer; the holding means including first connecting means for connecting to the distributing conveyer, second connecting means for connecting an accommodating unit having an opening facing upwardly and holding an article therein, an arm having one end at which the first connecting means is provided turnably and the other end at which the second connecting means is provided turnably, and attitude maintaining means for maintaining the opening of the accommodating unit so as to face upwardly at all times when the arm turns around the first connecting means, the accommodating unit being positioned at a position for holding an article when the arm is turned around of the first connecting means away from an article shift position to take a substantially horizontal attitude and at the article shifting position when the arm is turned around the first connecting means away from the article holding position to take a substantially horizontal attitude.

It is an object of the present invention to provide to a degripping apparatus comprising: an attaching member fixed to an endless recirculating traveling means; a rotational shaft supported on the attaching member; a gripping arm pivoted on the rotational shaft, extending in the direction where the arm intersects with the rotational shaft, having an article griping mechanism at one end and turned in accordance with the rotation of the rotational shaft; and a drive arm fixed to the rotational shaft, extending in the direction where the drive arm intersects with the rotational shaft, having engaging means at one end and rotating the rotational shaft by the turning of the drive arm, whereby when the gripping arm is turned by means of the rotation of the rotational shaft from a position where the gripping arm is parallel to the direction of movement of the traveling means to a position where the gripping arm is perpendicular to the direction of movement of the traveling means, the gripping mechanism degrips the article, the gripping mechanism including a pair of opposing gripping members provided turnably longitudinally of the gripping arm at an end of the gripping arm, the gripping members having connecting portions meshing and pivoted with each other, whereby when one of the gripping members is turned, the other gripping member is also turned so that the gripping members open and close.

It is another object of the present invention to provide the degripping apparatus comprising: an actuating member having one end engaged with the opposing gripping members pivoted at an end of the gripping arm for gripping an article and another end extending above the gripping arm, the actuating member and the gripping members having the same pivotal shaft; a control member pivoted to the gripping arm for raising the actuating member upwardly around the shaft at all times; and the control member actuating the actuating member when the gripping members are opened to degrip the gripped article.

When articles are distributed, a process which conveys articles at high speed is employed in order to improve the handling capability. However, the conveyance speed is limited depending on conveyed articles, so that the handling capability cannot be improved.

According to the article conveying method of the present invention, that problem is solved, the through-put is doubled even if the articles are carried at the same speed as that employed conventionally.

An article conveying method according to the present invention changes the conventional concept of distributing articles and provides a new form of article conveyance.

Especially, the present invention provides a shift device for shifting articles in the conveyance passageway to therby maintain the accommodating unit so as to have an article receiving opening facing upwardly at all times to realize stabilized conveyance and transfer of articles.

According to the article degripping apparatus of the present invention, the article fall position is fixed even if an article is carried at high speed. When the article is discharged, the gripping members do not bound to make contact with the falling article. Thus, the article is accommodated stably in a concavity in a packaging container placed downward.

Other aspects and advantageous of the invention will become apparent from the following detailed description and the accompanying drawings illustrating by way of example the features of the present invention.

BRIEF DESCRIPTION OF THE DRAWINGS

FIG. 3 illustrates the movement of the embodiment;

FIGS. 11(a), (b) illustrate the movement of the packet unit of FIG. 10;

DETAILED DESCRIPTION OF THE PREFERRED EMBODIMENTS

An article conveying method of the present invention will be described by taking an egg selecting and packaging apparatus as an example.

An egg selecting and packaging apparatus which is used most widely in the field of egg industries arranges cleaned and dried eggs in order in rows (usually in six rows) with their longitudinal axes being kept horizontal and feeds them sequentially, measures their weights and distributes those eggs into packs according to weight grade using a distributing conveyor.

The present embodiment corresponds to such conventional apparatus. An egg selecting and packaging apparatus which employs an egg conveying method of the present invention will be described with reference to FIGS. 1-6.

Figure 1:
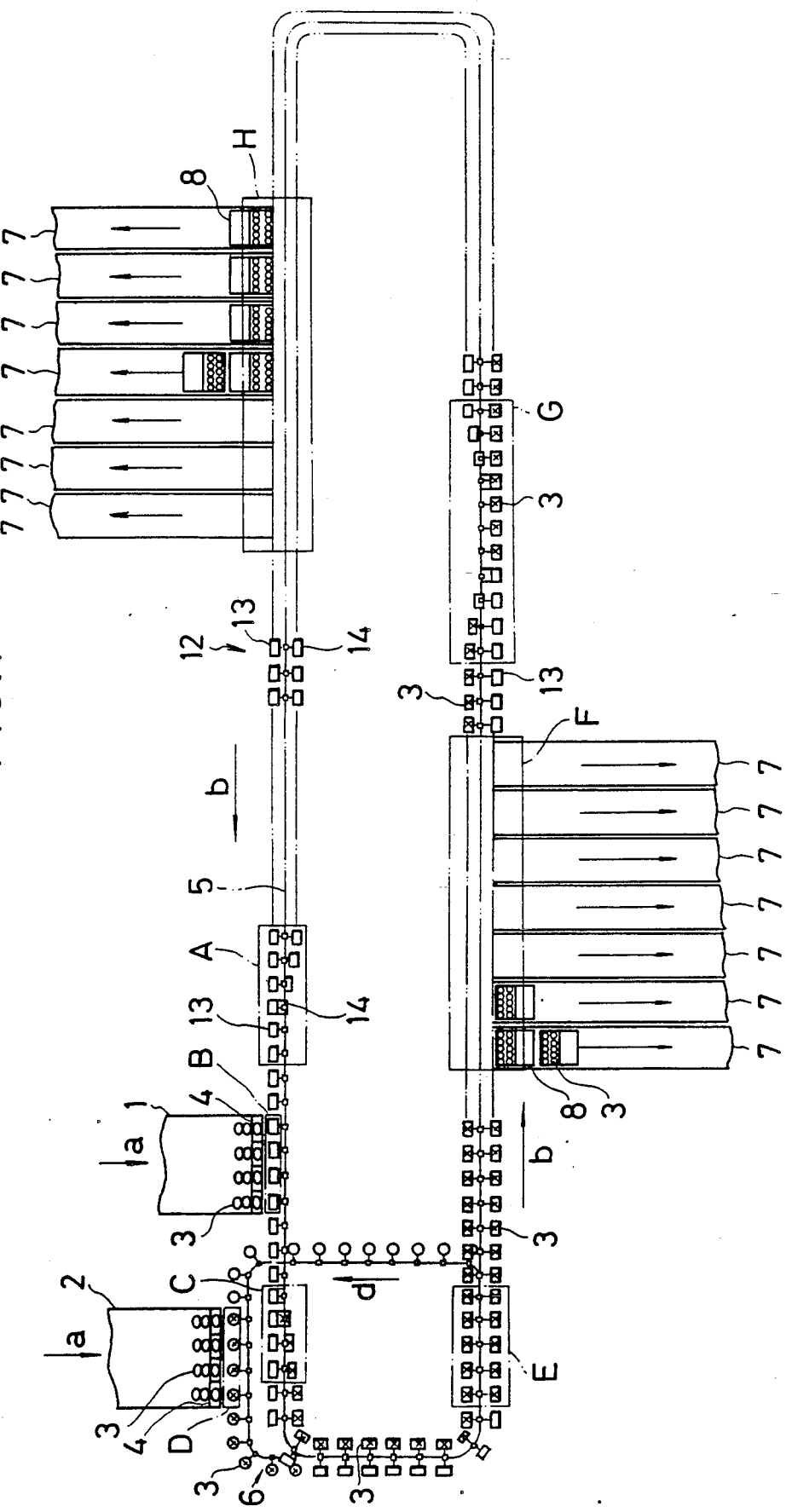
FIG. 1 is a plan view of a first embodiment of the present invention.

Referring to FIG. 1, a first feed conveyer 1 and a second feed conveyer 2 are provided for conveying cleaned dried eggs arranged thereon in order (in four rows in the particular embodiment) in the direction of arrow a. Measuring units 4 which are the same in number as the rows of the eggs are provided at a discharge end of each of the feed conveyers 1 and 2. The eggs 3 conveyed by the first conveyer 1 are transferred to a distributing conveyer 5 (to be described later in more detail) after weight measurement. The eggs 3 conveyed by the second conveyer 2 are temporarily transferred to a bucket conveyer 6 (to be described later in more detail) and then transferred to the distributing conveyer 5 in the course of conveyance of the conveyer 6. The eggs 3 transferred to the distributing conveyer 5 are discharged according to their grades or weights measured by the measuring units 4 at discharge positions where seven packaging conveyers 7 are provided in the passageway of the distributing conveyer 5 in the direction of arrow b. In order to package the eggs according to weight grade, the seven packaging conveyers are allocated egg sizes of 2L, L, M, MS, S, 2S and others classified according to weight. Each packaging conveyer 7 has an egg pack 8 which accommodates eggs 3 sequentially.

Figure 2:
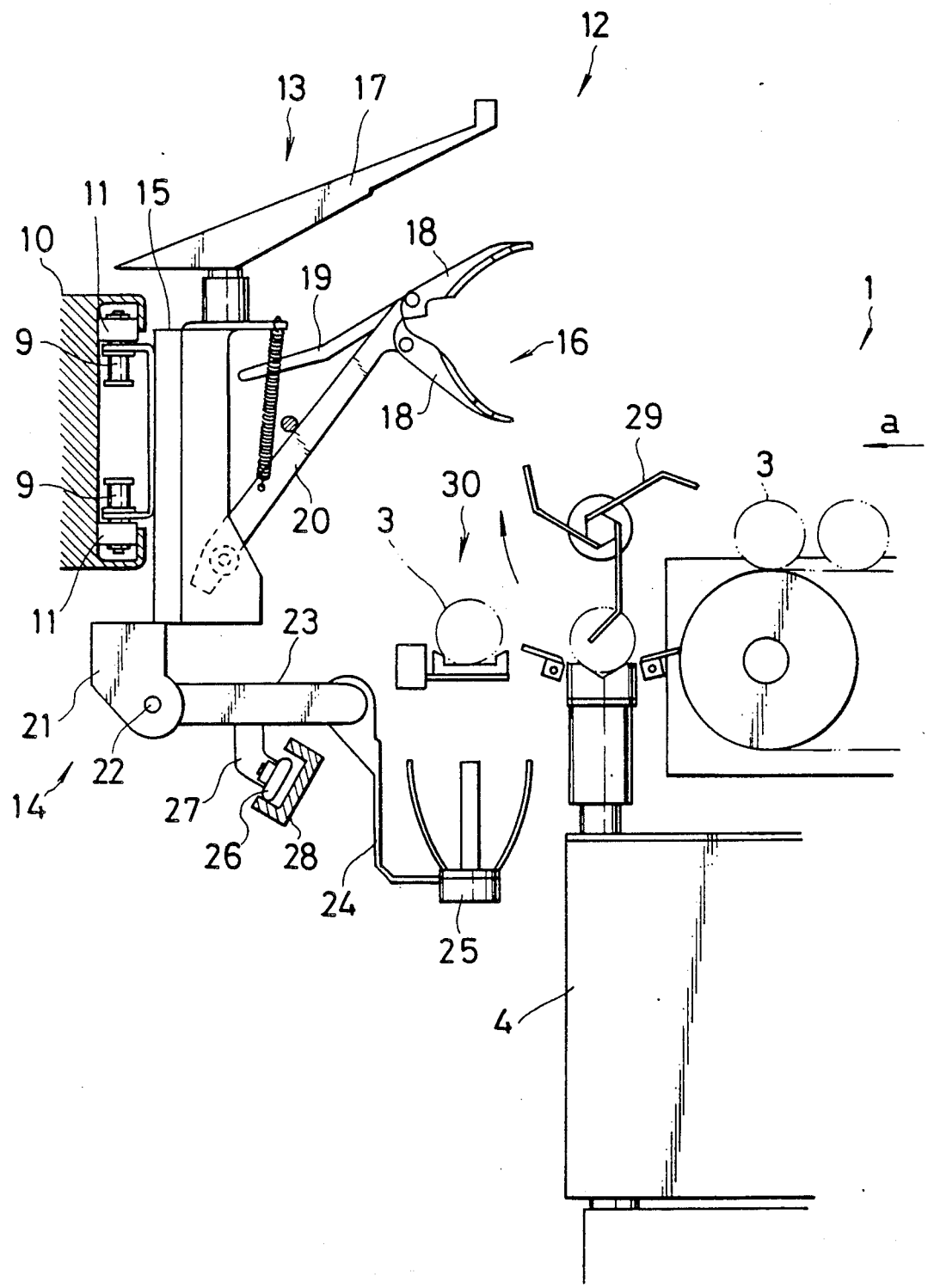
FIG. 2 is a side view of the embodiment at a first feed position.

The specified structure of the distributing conveyer 5 will be described next with respect to FIG. 2. The distributing conveyer 5 includes a pair of endless recirculating chains 9 and a rail 10 provided along the passageway of the conveyer 5 and rollers 11 provided on the chains 9 such that the chains pass on the rail 10. Carriages 12 are provided at equal intervals on the chains 9. Each carriage 12 includes a discharge unit 13 which may be an egg charge or degripping unit which discharges an egg 3 gripped so far onto the packaging conveyer 7, and a holding unit 14 which holds another egg 3 until the discharge unit 13 discharges the former egg 3.

The discharge unit 13 includes a plate 15 fixed to chains 9, a finger unit 16 which grips an egg 3 and discharges it onto the packaging conveyer 7, and a lever 17 which controls the direction of finger unit 16. The finger unit 16 includes fingers 18 constituting a grip which holds egg 3, a finger lever 19 which opens and closes the fingers 18, and a finger arm 20 which has the fingers 18 at one end, and which is pivoted at the other end to plate 15 and swung vertically by the resiliency of a spring. The details of the operation of the discharge unit 13 is disclosed in Japanese Patent Laid Open No. Sho 56-127513. Further description of all the respective operations of the elements of the discharge unit 13 will here be omitted and required description of the elements involved will be made in the description of the operation of the carriages 12 of the present embodiment.

Each holding unit 14 provided below the corresponding discharge unit 13 includes a connector 21 connected to plate 15, an arm 23 pivoted through a pivot 22 to the connector 21, a cup 25 as a holding unit provided through a cup support 24 depending swingably from an end of arm 23, and a guide 27 provided in the middle portion of arm 23, and which is provided with a roller 26 to a free end therof. The cup support 24 is supported swingably at the end of arm 23 such that an opening in cup 25 faces upwardly at all times.

The roller 26 at guide 27 is engaged with a guide rail 28 as a guide passageway provided below carriage 12 along the passageway of distributing conveyer 5. Guide rail 28 is provided along rail 10. FIGS. 3(a), (b) and (c) shows the arm 23 and cup 25 which move to either the right or left of arm pivot 22 in accordance with the shape of the passageway of guide rail 28 when roller 26 of guide 27 engaged with guide rail 28 rolls on rail 28. FIG. 3(a) shows the arm 23 of holding unit 14 extending horizontally and having the opening in cup 25 facing upwardly. At this time, guide rail 28 is below the horizontal arm 23. The range in which guide rail 28 changes is on a semi-circular locus drawn around the pivot 22 as a center with a radius equal to the distance between pivot 22 and roller 26 and ranging from the position of roller 26 where arm 23 takes a horizontal attitude to another position of roller 26 where the horizontal arm 23 also takes a horizontal attitude and rotated leftward or clockwise through about 180 degrees from the former roller position. FIG. 3(b) shows arm 23 which is rotated around pivot 22 to the position where arm 23 takes a downward vertical attitude. In this case, guide rail 28 is at a position on a circular locus turned leftward or clockwise through about 90 degrees from the position of FIG. 3(a). The roller 28 moves along the curved shape of guide rail 28. Even if arm 23 is turned rightward (or counterclockwise) or leftward (or clockwise) around pivot 22, the attitude of cup 25 is maintained such that its opening faces upwardly. FIG. 3(c) shows arm 23 which is further rotated leftward or clockwise to a horizontal position where guide rail 28 is at a position on a circular locus turned rotated about 180 degrees leftward or clockwise from the FIG. 3(a) position. Also, in this case, the attitude of cup 25 is maintained such that its opening faces upwardly. Namely, even if cup 25 is moved leftward (or clockwise) or rightward (or counterclockwise) by turning arm 23, its attitude is maintained such that its opening faces upwardly at all times.

Figure 4:
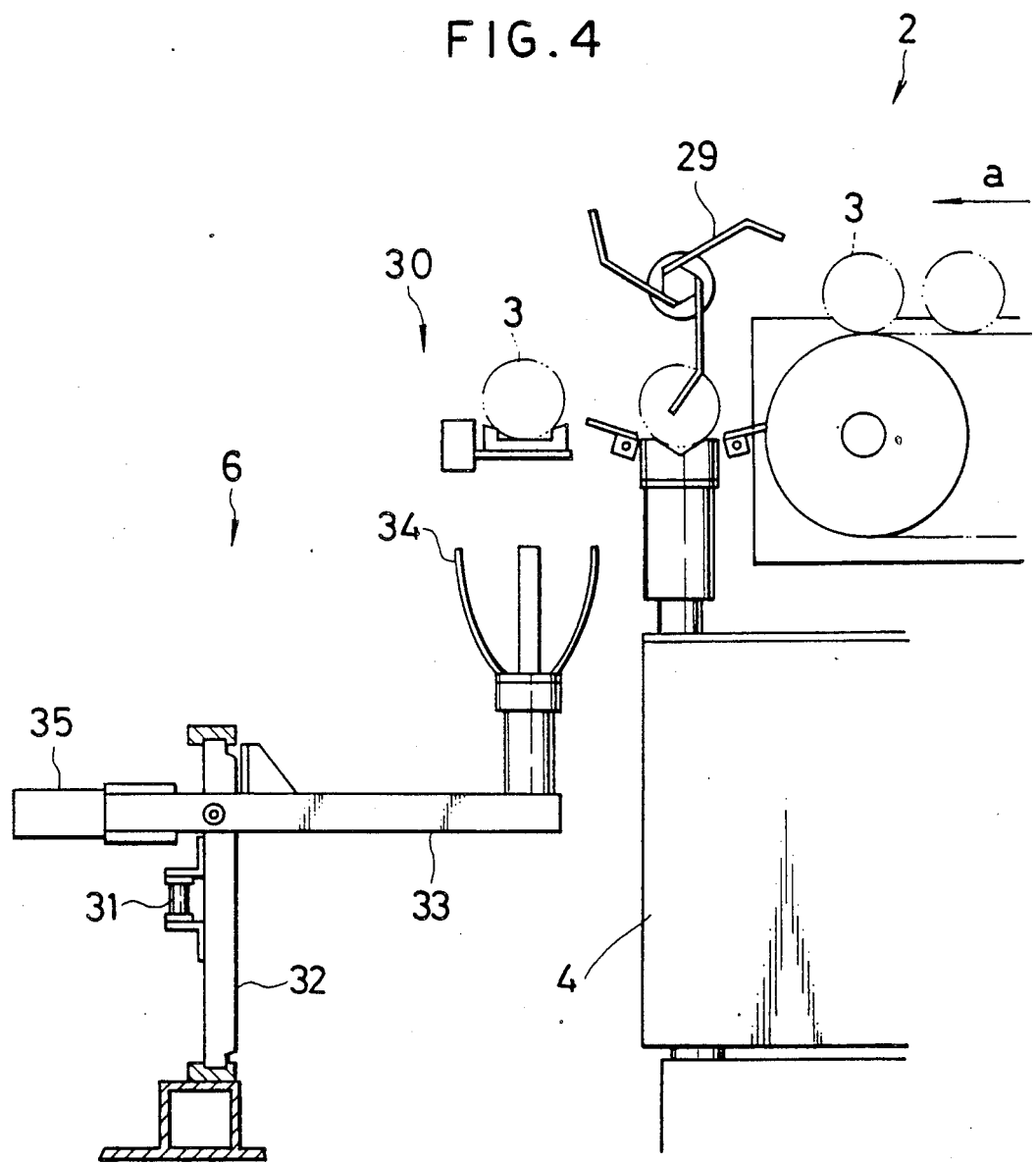
FIG. 4 is a side view of the embodiment at a second feed position.

A bucket conveyer 6 is moved in the direction of arrow d along measuring units 4 provided at the discharge end of second feed conveyer 2. Bucket conveyer 6 is positioned below distributing conveyer 5 such that its passageway overlaps with that of distributing conveyer 5. As shown in FIG. 4, bucket conveyer 6 includes an endless chain 31, a plurality of bucket plates 32 fixed to chain 31 at the same pitches as carriages 12 on distributing conveyer 5, a like number of arms 33 one attached swingably to each bucket plate 32, a like number of bucket cups 34 each provided at an end of each arm 33 and a like number of weights 35 each provided at the other end of each arm 33 for balancing purposes. The detailed operation of bucket conveyer 6 is the same as that disclosed in Japanese Patent Laid Open No. Sho 57-13011. Thus, further description of all the respective detailed operations of conveyer 6 will be omitted and required descriptions of the conveyer operation will be made when required.

The operation of discharge unit 13 and holding unit 14 of each carriage 12 will be described in conjunction with the conveyance of distributing conveyer 5.

In FIG. 1, the discharge unit 13 of each carriage 12 is shown by a square drawn on the right side of distributing conveyer 5 as viewed in the direction of conveyance b and holding unit 14 by a square drawn on the left side distributing conveyer 5. The symbol "x" in square shows an egg 3 accommodated in discharge unit 13 or holding unit 14.

Discharge units 13 of carriages 12 are moved in the direction of arrow b such that empty discharge units 13 are placed on the right side of conveyer 5 and empty holding unit 14 is placed on the left side of conveyer 5. First, at a position A in the passageway of distributing conveyer 5, holding unit 14 is moved from the position of FIG. 3(c) through the FIG. 3(b) position to the FIG. 3(a) position to thereby place cup 25 on the right side of the conveyer in order to accommodate an egg 3 in cup 25. Such carriages with cups 25 placed on the right side of conveyer 5 as shown in FIG. 3(a) are conveyed to a first feed position (B) before measuring unit 4 provided at the discharge end of first supply conveyer 1. At the first feed position B, the respective weights of egg 3 carried sequentially in four rows by first feed conveyer 1 are measured, and pushed away by impellers 29 onto corresponding acceleration units 30 (FIG. 2). Each acceleration unit 30 accelerates an egg 3 to the carrying speed of distributing conveyer 5 and then pushes egg 3 into cup 25 with the longitudinal egg axis held vertical. The acceleration unit 30 is well-known techniques and further description thereof will be omitted. After egg 3 is transferred to cup 25, carriage 12 which holds egg 3 in cup 25 is conveyed to a position C by distributing conveyer 5 moving in the direction of arrow b. At position C, cup 25 is moved from right to left (namely, from the FIG. 3(a) position through the FIG. 3(b) position to the FIG. 3(c) position) by guide rail 28 with egg 3 held in cup 25.

Figure 5:
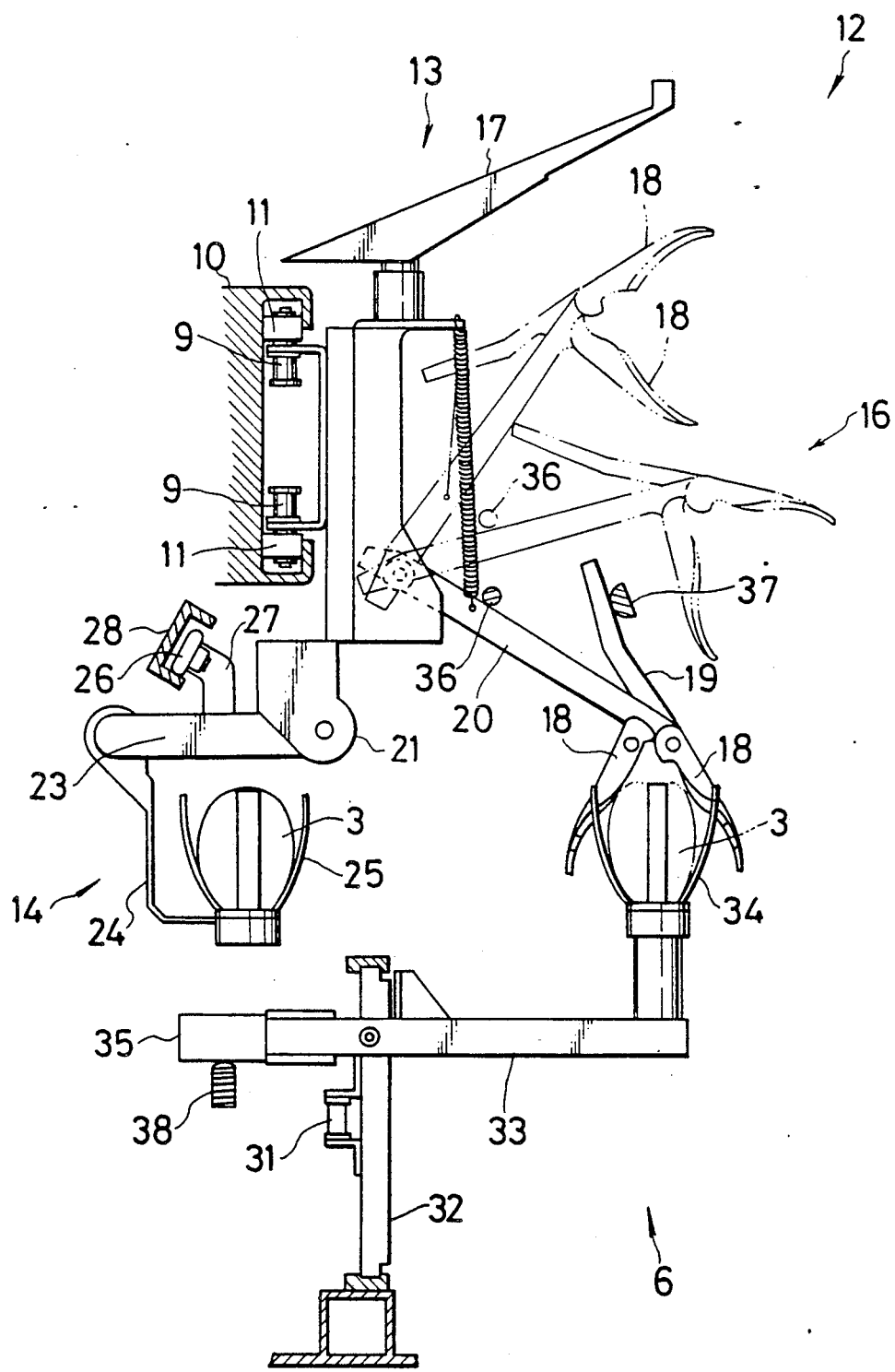
FIG. 5 is a side view of the embodiment at a transfer position.

Eggs 3 conveyed by second feed conveyer 2 are also measured and pushed into bucket cups 34 by acceleration unit 30 (FIG. 4). Bucket conveyer 6 is moving in the direction of arrow d, each bucket cup 34 which accommodates egg 3 is carried in the direction of arrow d together with bucket plate 32 fixed to endless chain 31. The conveyers 5 and 6 have a transfer position E in their passageways where they overlap in a vertical plane. FIG. 5 shows the positional relationship between carriage 12 and bucket cup 34 at position E. Carriages 12 and bucket cups 34 are conveyed to the transfer position E. At position E, a first guide rod 36 is provided so as to be downward inclined radually in the same direction as arrow b along the passageway of distributing conveyer 5. Thus, finger arm 20 of finger unit 16 is carried in the direction of arrow b while being gradually pushed downward. Carriages 12 and bucket cups 34 of bucket conveyer 6 are carried at the same pitch in the same direction such that each bucket cup 34 is placed below the corresponding carriage 12. Finger unit 16 is pushed slowly downward and fingers 18 of finger units 16 cover egg 3 in bucket cup 34. Thereafter, finger lever 19 is pressed down by second guide rod 37 and fingers 18 operated by finger lever 19 grip egg 3 on both sides. Thereafter, bucket arm 33 is moved inclined slowly clockwise by third guide rod 38. Thus, when carriage 12 moves away position E, fingers 18 of finger unit 16 hold egg 3. Namely, when carriage 12 has passed through position E, the discharge unit 13 holds egg 3 and cup 25 of holding unit 14 accommodates another egg 3.

Figure 6:
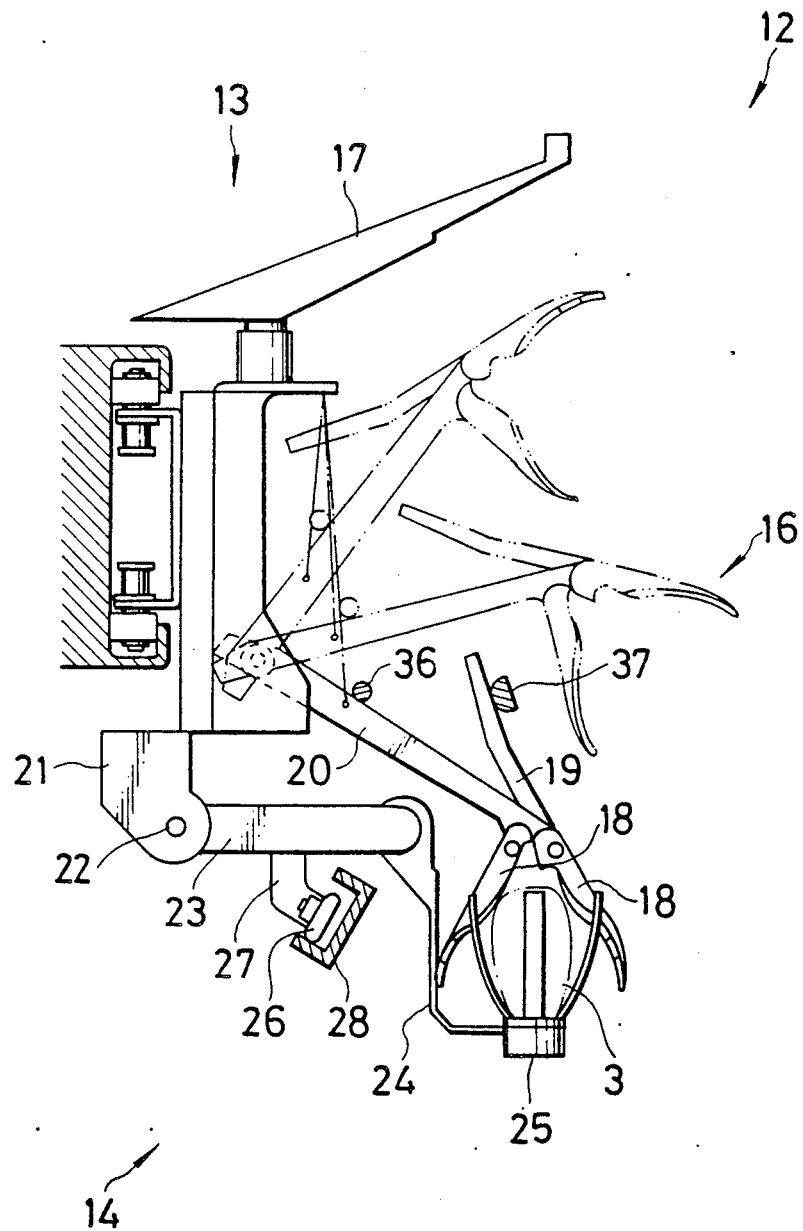
FIG. 6 is a side view of the embodiment, showing the shift of an egg from a holding unit to a discharge unit.

Eggs 3 held by discharge units 13 of carriages 12 are discharged at first discharge position F as a packaging station, where distributing conveyer 5 intersects with seven packaging conveyers 7, according to the weight grades of eggs 3 into appropriate ones of egg packs 8 placed beforehand on packaging conveyers 7. The process where fingers 18 open and discharge egg 3 is the same as that disclosed in U.S. Pat. Nos. 4,462,201 and 4,396,109. At position F, all the eggs held by discharge units 13 are discharged. When carriages 12 have passed through position F, discharge unit 13 have no eggs 3 and holding units 14 of carriages 12 hold eggs 3. A shift position G is provided ahead of first discharge position F in the passageway of distributing conveyer 5. At this position G, cup 25 of each holding unit 14 which holds egg 3 is turned through about 180 degrees from the left side to the right side of conveyer 5 (from the FIG. 3(c) position through the FIG. 3(b) position to the FIG. 3(a) position). Egg 3 in holding unit cup 25 is shifted to discharge unit 13 and empty cup 25 of holding unit 14 is then turned through about 180 degrees from the right side to the left side of conveyer 5 (from the FIG. 3(a) position through the FIG. 3(b) position to the FIG. 3(c) position). The shift of egg 3 at position G is shown in FIG. 6. Also, at position G, first guide rod 36 is gradually lowered in the same direction as distributing conveyer 5 moves. Finger arm 20 is pressed down by first guide rod 36 to cause finger unit 16 to be inclined clockwise as shown in FIG. 6. When fingers 18 cover egg 3 in cup 25, finger lever 19 in conjunction with fingers 18 is gradually pressed by second guide rod 37 to thereby grip egg 3 on both sides. When fingers 18 hold egg 3, the empty cup 25 of holding unit 13 is moved leftward (from the FIG. 3(a) position through the FIG. 3(b) position to the FIG. 3(c) position) by guide rail 28. Thus, discharge unit 13 is moved to second discharge position or station H with discharge unit 13 holding egg 3. Also, at this second position H, egg 3 held by discharge unit 13 is discharged according to weight grade into egg pack 8 placed beforehand on packaging conveyer 7. Thus, when passing through second discharge position H, discharge unit 13 and holding unit 14 of each carriage 12 have no eggs 3 or are empty and carried toward the position A by distributing conveyer 5 in order to handle new eggs 3.

When empty discharge unit 13 and empty holding unit 14 of carriage 12 are carried to position A, holding unit 14 is positioned to rightward from leftward below carriage 12. After holding unit 14 holds egg 3 at first feed position B, it is again positioned to rightward from leftward at position C. When carriage 12 is carried in the direction of arrow b under such condition, discharge unit 13 holds another egg 3 fed by bucket conveyer 6 at transfer position E. Thus, one egg 3 is held in holding unit 14 at this time and another egg 3 is held in discharge unit 13.

There is first discharge position F in the passageway of distributing conveyer 5 at which position F discharge unit 13 discharges egg 3. When carriage 12 has passed through first discharge position F, it arrives at shift position G where holding unit 14 positioned leftward below carriage 12 moves rightward. Empty discharge unit 13 again holds another egg 3 held by holding unit 14 at which time, empty holding unit 14 again moves leftward below carriage 12. At second discharge position H, discharge unit 13 discharges egg 3 held so far.

Figure 7:
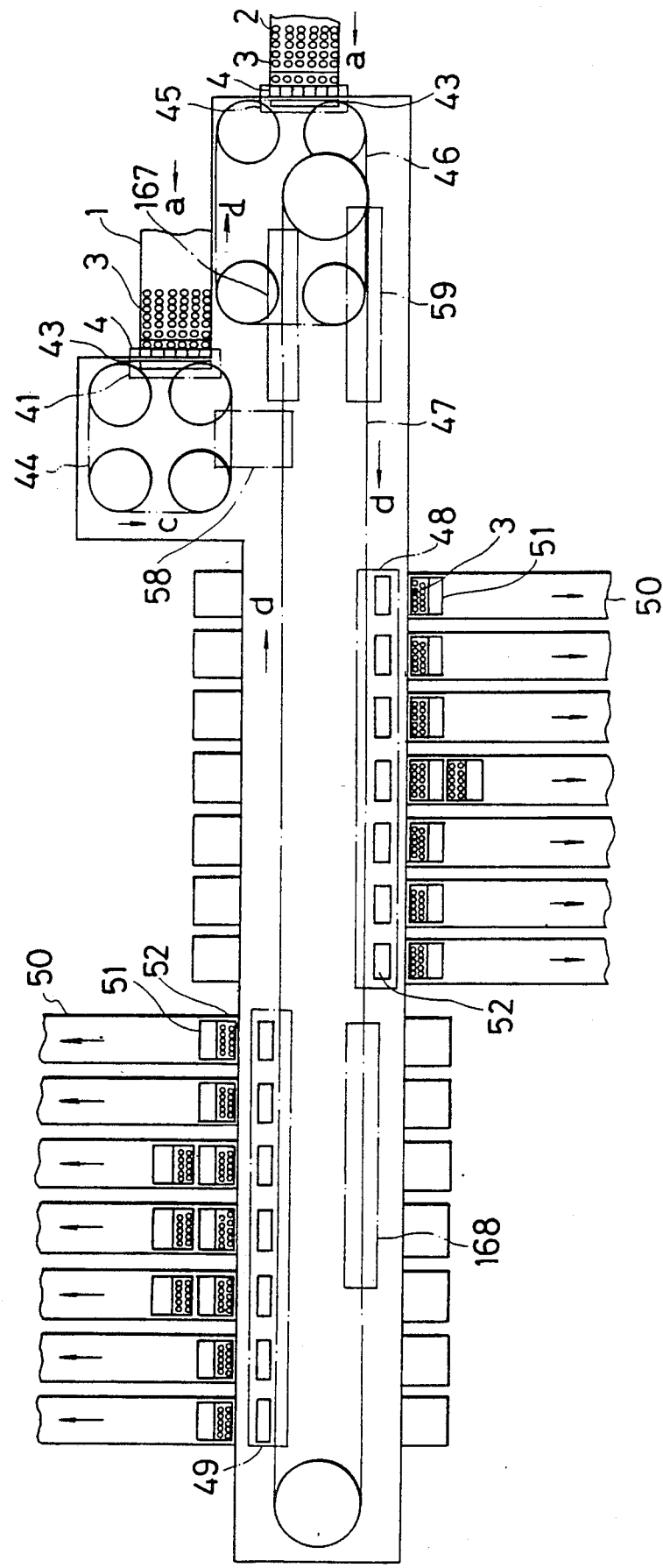
FIG. 7 is a plan view of a second embodiment of the present invention.
Figure 8:
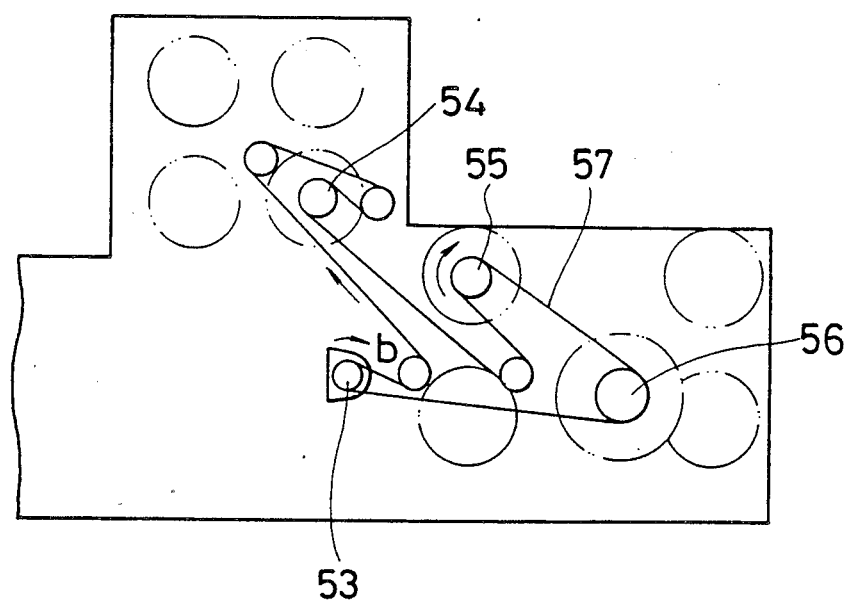
FIG. 8 illustrates a prime mover of the second embodiment.

A selector as another embodiment of the present invention will be described with reference to FIGS. 7-24. As shown in FIG. 7, the selector includes first and second feed conveyers 1 and 2 carried in the direction of arrow a to convey cleaned and dried eggs arranged in order in six rows on these conveyers 1, 2 with longitudinal egg axes being horizontal. Measuring units 4 equal in number to the rows of eggs are provided at the respective discharge ends of conveyers 1 and 2. After eggs 3 carried by conveyer 1 are measured, they are pushed away by impellers 42 (FIG. 9) at first feed station 41 into shift unit 43, which shifts eggs 3 such that their longitudinal axes are in a vertical plane, accelerates the eggs to the conveyance speed of first bucket conveyer 44 (to be described in more detail later) and then shifts them. Shift unit 43 is well-known techniques, for example, in Japanese Patent Publication Laid Open No. Sho 61-287622. Thus, further detailed description of the shift unit will not be made and required description will be made when required. As described above, eggs 3 transferred to the shift unit 43 are changed such that their longitudinal axes are vertical, accelerated and transferred to first bucket or recirculating conveyer 44.

After eggs 3 conveyed by second feed conveyer 2 are measured, they are also pushed away by impellers 42 at second feed station 45, transferred to shift unit 43 and transferred to second bucket or recirculating conveyer 46 (to be described in more detail later). The eggs are then transferred to distributing conveyer 47 in the respective passageways of bucket conveyers 44, 46. Eggs 3 measured by measuring units 4 and transferred to distributing conveyer 47 are discharged to according weight grade to packaging conveyers 50 disposed in seven rows at discharge stations 48, 49 provided in the passageway of distributing conveyer 47. In order to package eggs according to weight grade, the conveyers 50 are allocated to grades 2L, L, M, MS, S, 2S and other eggs. An egg pack 51 is placed beforehand on each packaging conveyer 50 such that eggs 3 are accommodated sequentially into pack 51 by a discharge unit 52 provided above each of packaging conveyers 50 at respective discharge stations 48, 49 (disclosed in U.S. Pat. No. 4,396,109). Further description of the structure of the discharge unit will be omitted and required description will be made when required.

Drive sprockets 54, 55 and 56 of first and second bucket conveyers 44, 46 and distributing conveyer 47 are connected to drive motor 53 (FIG. 8) through an endless chain 57. Drive motor 53 rotates clockwise or in the direction of arrow b and its drive force is transmitted through chain 57 to drive sprocket 54. Therefore, first bucket conveyer 44 is carried in the direction of arrow c. The rotation transmitted to drive sprocket 54 is transmitted to drive sprocket 55 by chain 57. Thus, second bucket conveyer 46 is carried clockwise or in the direction of arrow d. The rotation transmitted to drive sprocket 55 is finally transmitted to drive sprocket 56 through chain 57. Therefore, distributing conveyer 47 is also carried in the direction of arrow d, so that first and second bucket conveyers 44, 46 and distributing conveyer 47 are carried at the same speed. At first transfer station 58 where first bucket conveyer 44 faces distributing conveyer 47, first bucket conveyer 44 and distributing conveyer 46 are carried parallel in the same direction. At second transfer station 59 where passageway of distributing conveyer 47 and the passageway of second bucket conveyer 46 under the distributing conveyer 47 overlap, conveyers 46 and 47 are carried in the same direction of arrow d. First bucket conveyer 44 is carried also under distributing conveyer 47.

Shift unit 43 which shifts eggs 3 from first feed conveyer 1 to first bucket conveyer 44 and shift unit 43 which shifts eggs 3 from second feed conveyer 2 to second bucket conveyer 46 are the same in structure as mentioned above. Since the first and second bucket conveyers 44 and 46 have the same structure, the same reference number is used for explaining purposes.

Figure 9:
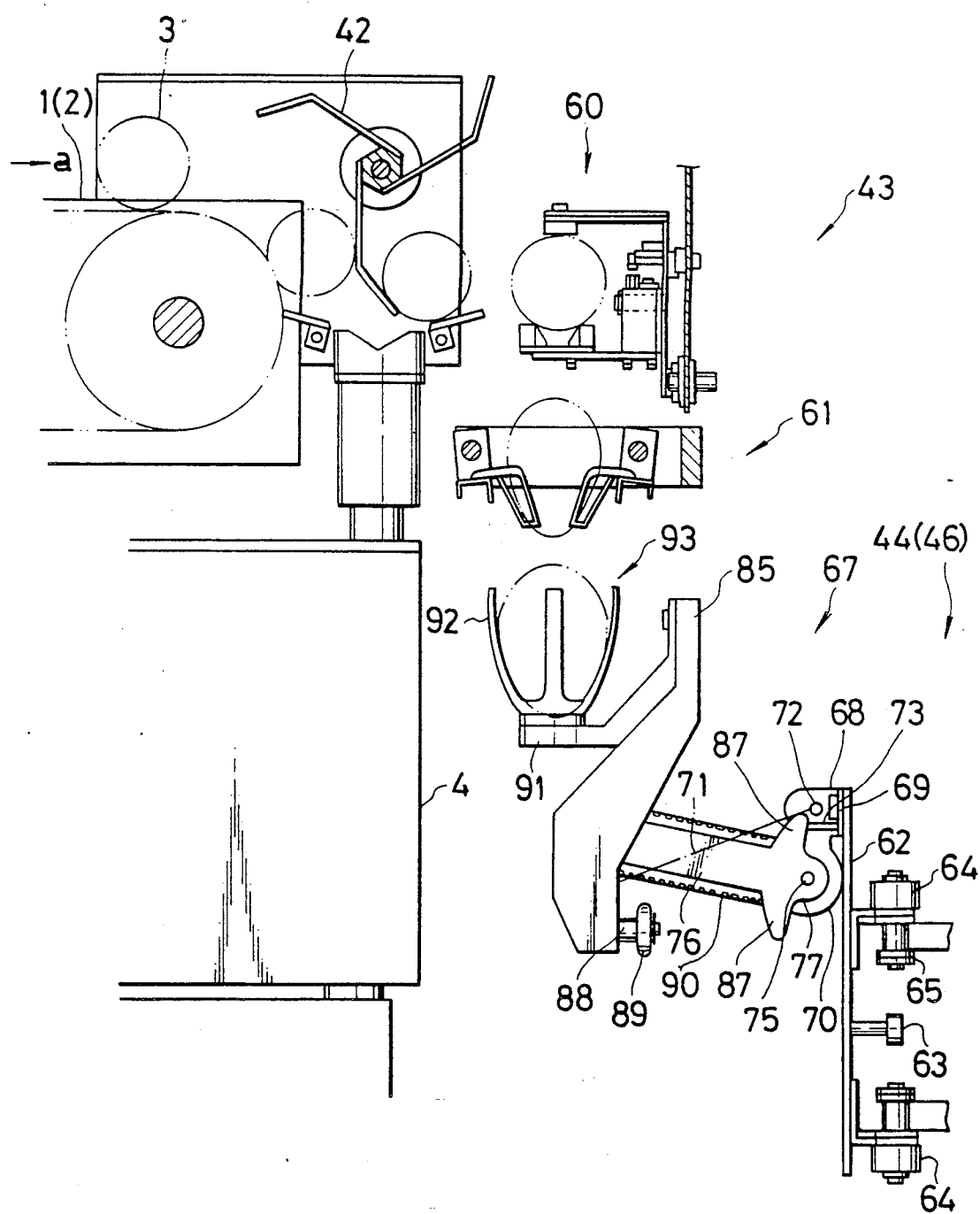
FIG. 9 is a side view of a first and a second feed station of the second embodiment.

FIG. 9 shows first and second feed stations 41 and 45. In FIG. 9, transfer unit 43 is placed at the respective discharge ends of feed conveyers 1 and 2 and includes six holding units 60 which have an axis converting function of changing the longitudinal axis of egg 3 from the horizontal to the vertical and six acceleration units 61 which accelerate eggs 3 to the conveyance speed with their longitudinal axes vertical and pushes them downwardly into bucket conveyers 44, 46.

Figure 12:
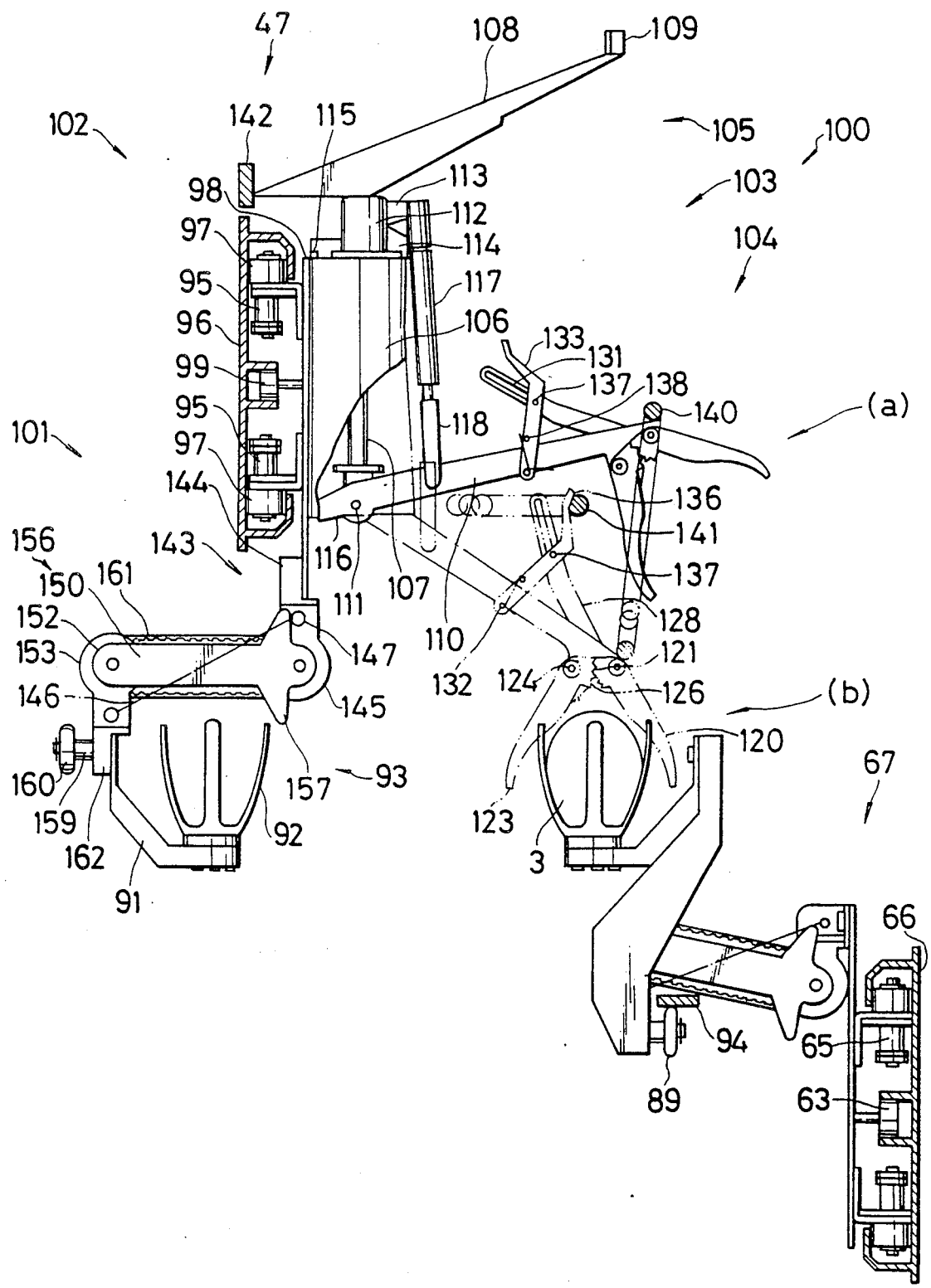
FIG. 12 is a side view of a first and a second transfer station of the second embodiment.

Bucket conveyers 44, 46 each include a plurality of equi-spaced chain plates 62. Each plate 62 has a support roller 63 attached thereto. Roller 64 pivoted to chains 65 carry bucket conveyer 44 (46) in conjunction with support roller 63 along rail 66 (FIG. 12).

Figure 10:
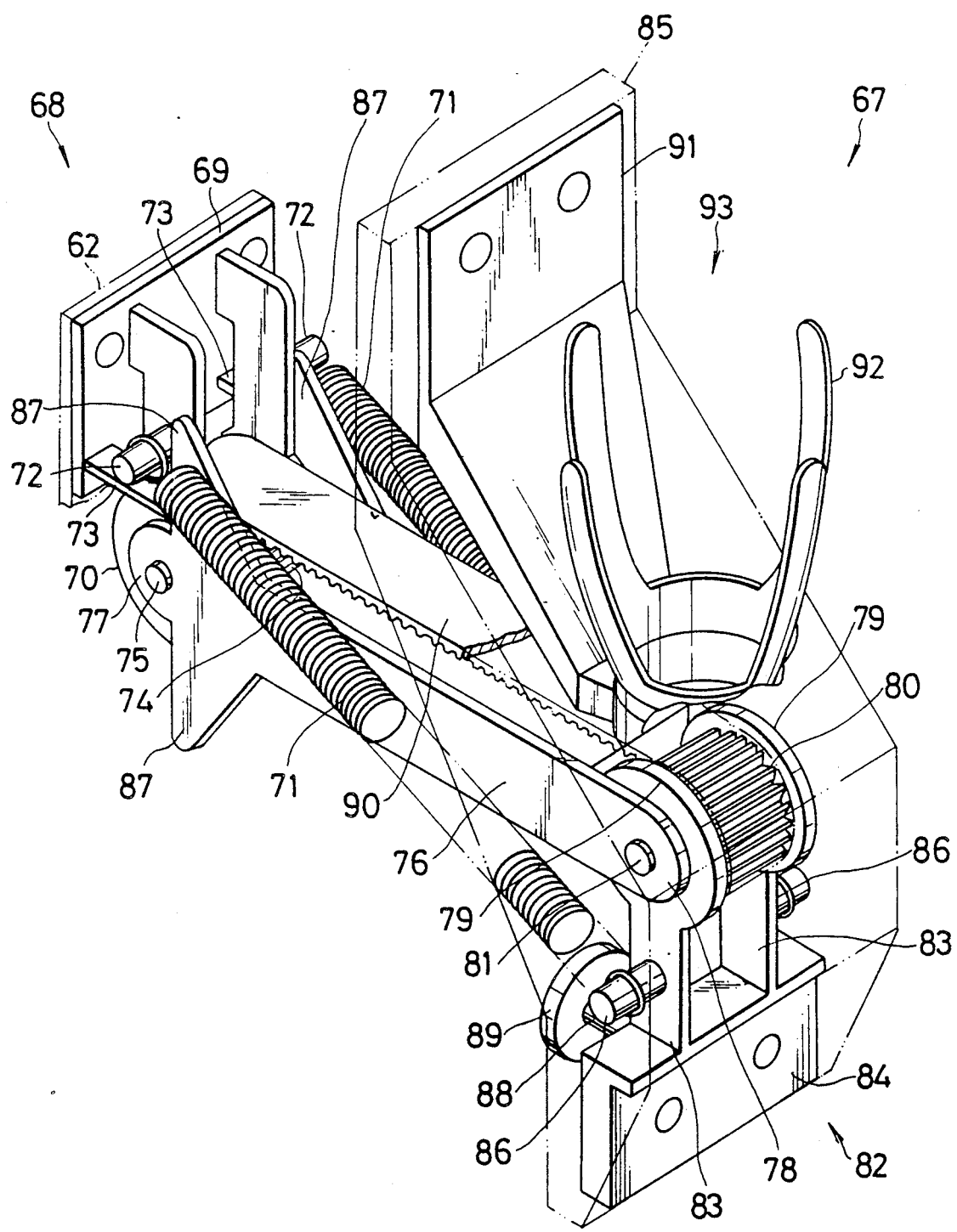
FIG. 10 is a perspective view of a bucket unit of the second embodiment.

In FIG. 10, bucket unit 67 is attached to each chain plate 62. Connector 68 includes a flat plate 69 fixed conformably to an upper end of chain plate 62 and a pair of parallel circular shaft supports 70 each having an L-like leg which has one end fixed to flat plate 69. Connector 68 has a pair of outward rods 72 which anchors one end of a pair of springs 71 and a pair of stops 73 extending perpendicular to plate 69. The pair of shaft supports 70 holds pulley 74 therebetween with the aid of shaft 75 such that supports 70 and pulley 74 are fixed to each other and that pulley 74 is rotatable around shaft 75. A pair of turnable arms 76 are provided in connector 68 such that they hold shaft supports 70 between their semicircular holding plates 77 fixed to shaft 75.

The other ends of arms 76 are also formed as a semicircular holding plate 78, and hold circular shaft supports 79 of connector 82 and pulley 80 which is integral with shaft supports 79 therebetween with the aid of shaft 81 such that shaft support 79 and pulley 80 are rotatable around shaft 81 which is fixed to holding plates 78. Shaft supports 79 each have a rectangular leg 83 which is supported by an angle block 84 fixed to bucket base 85. Each leg 83 has an outward protrusion 86 which anchors the other end of corresponding spring 71.

The arm holding plates 77 each connected to shaft support 70 of connector 68 have a pair of opposite triangular protrusions 87 each having a side extending transverse to arm 76 and passing through the diameter of that holding plate 77. Each protrusion 87 extends to a position where it abuts on stop 73. Thus, arms 76 are resiliently pressed by connectors 68 and 82 with the aid of springs 71. As shown in FIG. 9, protrusions 87 abut on corresponding stops 73 at a position where arms 76 are tilted slightly relative to their attitude perpendicular to chain plate 62.

Connector 82 has a roller shaft 88 extending perpendicular to chain plate 62 and a roller 89 provided rotatable on roller shaft 88. When roller 89 is carried along the guide rail, vertical movements of bucket unit 67 are controlled. An endless timing belt 90 extends with no slacks around pulleys 74, 80 attached to the respective ends of arm 76.

Bucket base 85 fixed to connector 82 at its lower end comprises a cup holding member which, in turn, comprises a vertical rise portion, a bent portion tilted toward arms 76 and another vertical portion. Bucket base 85 has a substantially L-like cup support arm 91 fixed thereto. An article accommodating cup 93 of four pawls 92 opened upwardly in a radial manner is fitted into a lower end of cup support arm 91. Thus, since pawls 92 of cup 93 are attached so as to open upwardly, egg 3 is accommodated in cup 93 such that its longitudinal axis is vertical. Acceleration unit 61 is positioned above each cup 93 so as to accelerate the conveyance of egg 30.

As mentioned above, pulleys 74, 80 are fixed to connectors 68, 82, respectively, and rotatable relative to arms 76 through shafts 75, 81, respectively, and endless timing belt 90 extends around pulleys 74, 80. Therefore, even if arms 76 fluctuate vertically relative to connector 68, timing belt 90 extending around pulleys 74, 80 of connectors 68, 82 is engaged with pulleys 74, 80 such that irregularities on timing belt 90 mate with irregularities on pulleys 74, 80. Pulleys 74, 80 are fixed to connectors 68, 82, respectively, so that the two pulleys 74, 80 are not moved and the bucket base 85 moves up and down with the cup 93 opening facing upwardly. As shown in FIG. 11, guide rail 94 is provided so as to abut on roller 89 and to take the form of a wave on the passageways of bucket conveyers 44, 46. When roller 89 moves on the lower surface of guide rail 94, bucket base 85 is fluctuated vertically following the shape of guide rail 94. When roller 89 is carried in the contact with the top of the waveform of guide rail 94, protrusions 83 of arms 76 abut on stops 73 by the action of springs 71 to thereby maintain cup 93 at its highest position as shown in FIG. 11(a). When roller 89 moves from the top to bottom of the waveform of guide rail 94, bucket unit 67 gradually lowers and cup 93 lowers to its lowest position shown in FIG. 11(b).

Figure 13:
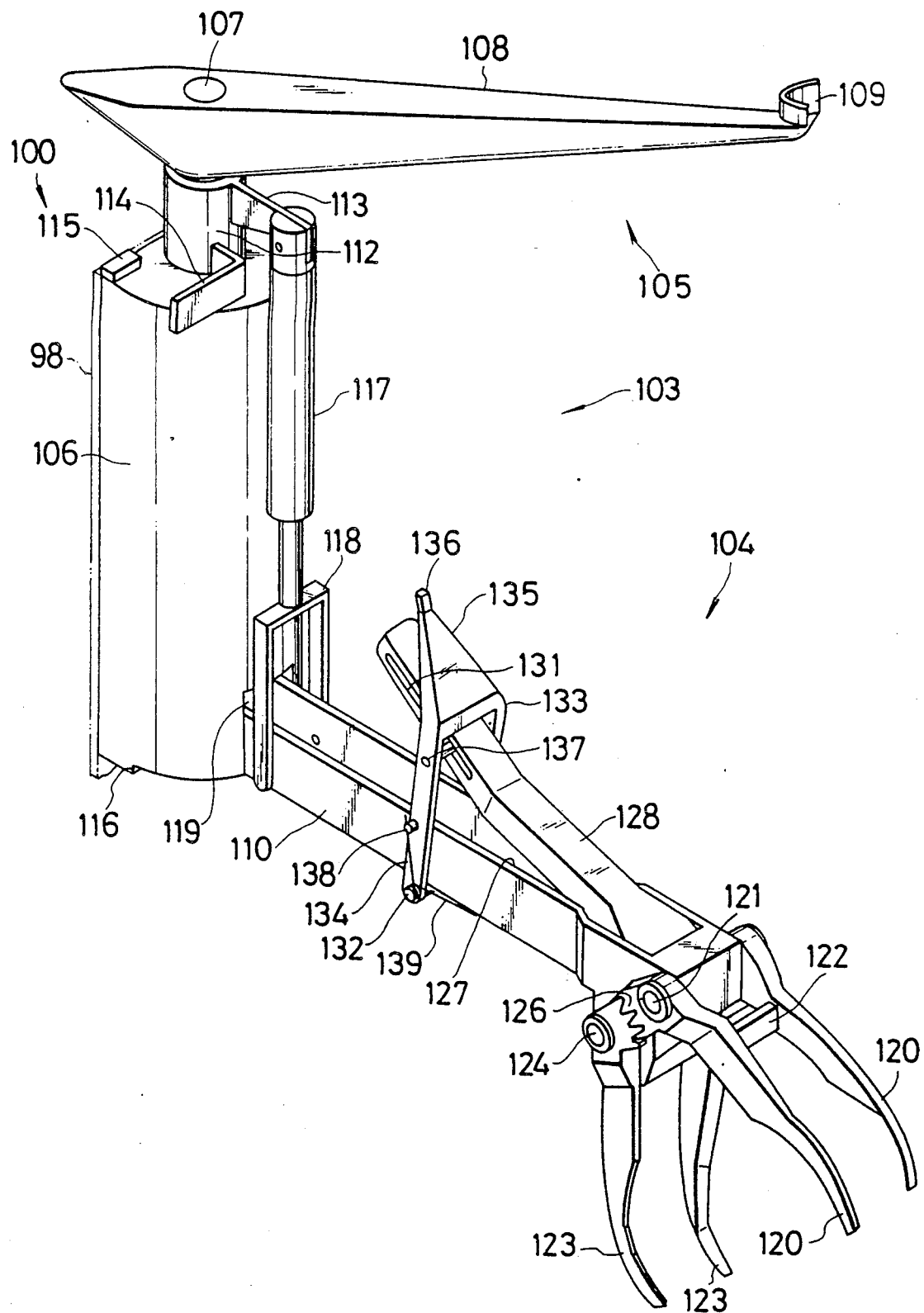
FIG. 13 is a perspective view of a charge unit of the second embodiment.
Figure 14:
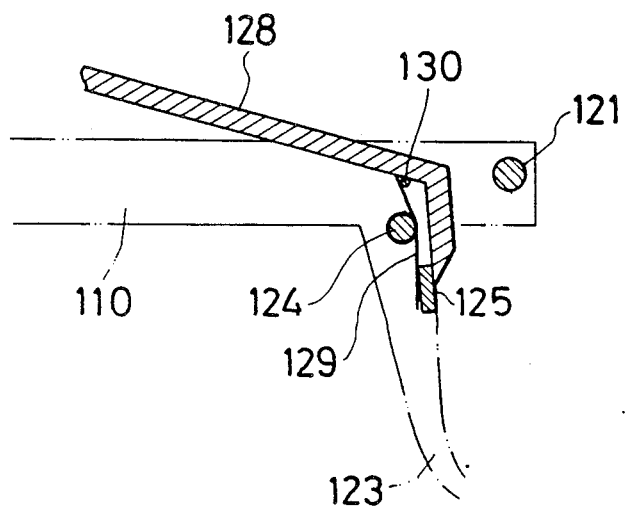
FIG. 14 is a partially cross-sectional view of a finger unit shown in FIG. 13.

The specified structure of distributing conveyer 47 will now be described with reference to FIGS. 12, 13 and 14. Distributing conveyer 47 includes a pair of endless recirculating chains 95, and a rail 96 provided along the passageway of distributing conveyer 47. A pair of rollers 97 are attached to corresponding chains 95 so as to be carried on rail 96. Chains 95 have equispaced chain plates 98 each having a support roller 99 carried along rail 96. Discharge unit 100 which may be a charge unit or degripping unit is fixed to the opposite side of chain plate 98 to roller 97 such that their upper edges are flush. A hold unit 101 is fixed to a lower end of chain plate 98. Discharge unit 100 which discharges egg 3 above packaging conveyer 50, and holding unit 101 which holds another egg 3 until discharge unit 100 discharges its egg 3 are combined as a unit to form carriage 102.

Discharge unit 100 includes bearing 103 which fixes discharge unit 100 to plate 98, finger unit 104 which has a gripping mechanism which holds egg 3 at an end and discharges it on packaging conveyer 50, and lever 105 which controls the direction of finger unit 104.

Rotational shaft 107 is supported rotatably by bearing bracket 106 fixed to chain plate 98 and functioning as a mounting member. The base portion of finger unit 104 is attached to a lower end of rotational shaft 107. Lever 108 extending in the same direction as finger 104 is attached at one end to an upper end of rotational shaft 107 and has at the other end an engaging portion 109 having a notch therein. By turning lever 108 with shaft 107 as the center, finger 104 unit is rotated. The base portion of finger or gripping arm 110 of finger unit 104 is attached swingably in a vertical plane around pin 111 to a lower end of rotational shaft 107 by pin 111 perpendicular to the axis of rotational shaft 107. The rotational shaft 107 of discharge unit 100 is attached to chain plate 98 such that the axis of rotational shaft 107 is vertical, so that pin 111 is maintained horizontal. Therefore, finger arm 110 swings vertically around pin 111 as if it made a bow.

Lever 108 and bearing bracket 106 are connected through collar 112. Lever 108, collar 112 and rotational shaft 107 are together fixed, so that they rotate as a unit by the rotation of rotational shaft 107. Collar 112 takes the form of a cylinder and has a support member 113 which extends from an upper end of collar 112 in the same direction as lever 108 and an L-like stop 114 at a lower end of collar 112. When collar 112 is turned, stop 114 abuts on a stop receiving member 115 extending from the upper rear end of bearing bracket 106, so that collar 112 turns no longer. If finger arm 110 is turned toward you in FIG. 12 so as to cause finger arm 110 to abut on the lower edge of bearing bracket 106 when finger arm 110 is in the state (b) shown by dot-dashed line in FIG. 12, finger arm 110 becomes substantially parallel to chain plate 98, stop 114 abuts on stop receiving member 115, and finger arm 110 abuts on an arm stop 116 formed at the lower end of bearing bracket 106. Finger unit 104 grips egg 3 in this state and carries it. An air damper 117 having a tensile force is attached at an upper end by pin with a play to support member 113 and at a lower end by pin with a play to a finger arm 110 in the vicinity of bearing bracket 106 through U-like support member 118 such that air damper 117 extends between finger arm 110 and support member. 113 of collar 112 to thereby bias finger arm 110 so as to move upwardly. When lever 108 and finger arm 110 are turned by the rotation of rotational shaft 107 to thereby be at 90 degrees to the plane of chain plate 98, finger arm 110 fits loosely into a rectangular groove 119 provided in the lower end of bearing bracket 106 which is in contact with arm 110. When finger arm 110 is in groove 119, it is biased by air cylinder 117, so that finger unit 104 swings its fingers vertically at that position so as to grip and degrip an egg.

Figure 15:
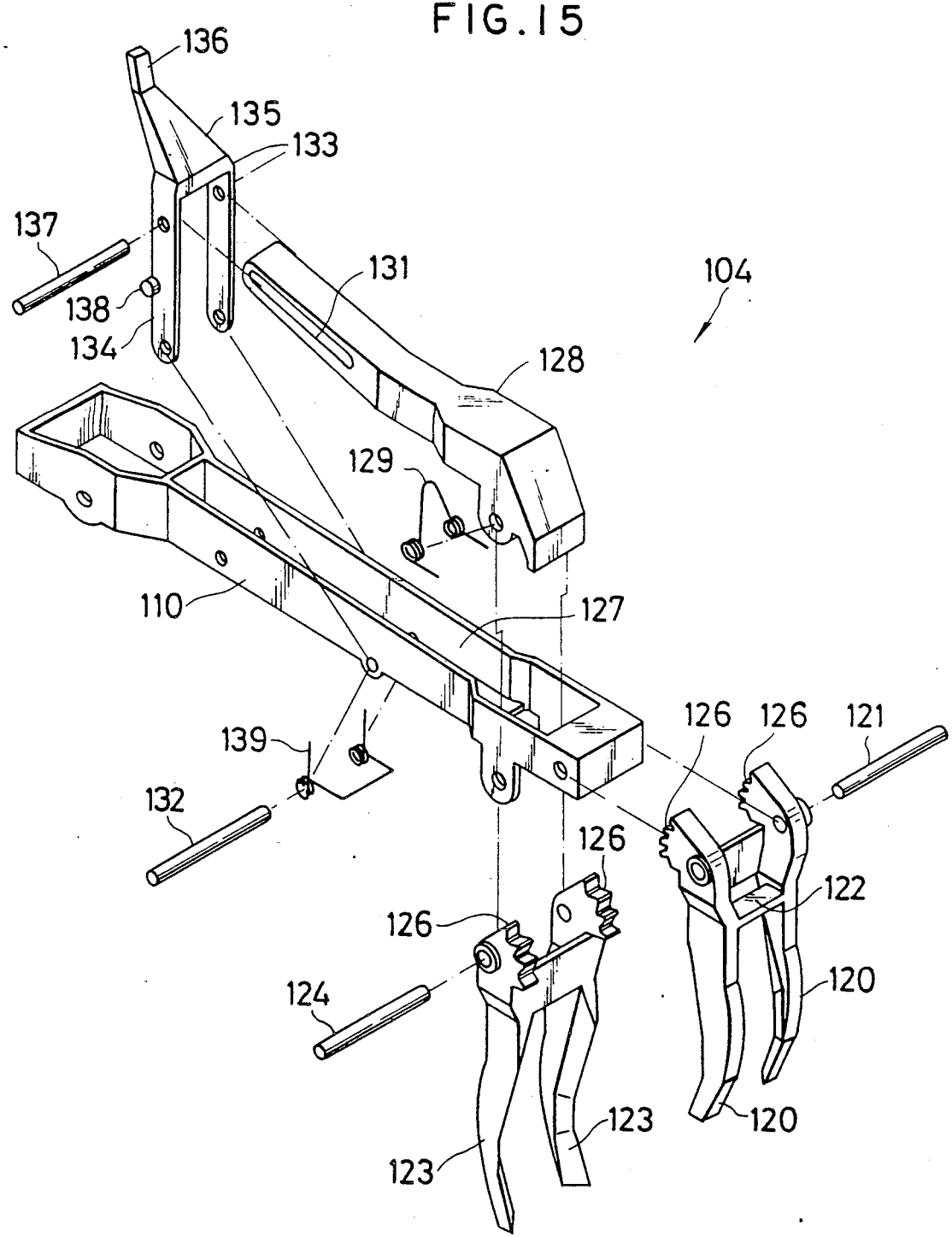
FIG. 15 is an exploded view of the finger unit of FIG. 13.

Finger unit 104 puts egg 3 into cup 93 of holding unit 101 or egg pack 51 or grips and receives eggs 3 in bucket 67 and cup 93 of holding unit 101. In structure, as shown in FIGS. 13 and 15, a pair of forward fingers 120 functioning as grip members which constitute a part of an article grip mechanism is supported by shaft 121 at an end of finger arm 110 so as to swing relative to finger arm 110 and to have a spacing formed by spacer 122 therebetween. A pair of backward fingers 123 is also supported by shaft 124 at the end of finger arm 110 so as to swing relative to finger arm 110 and to have a spacing formed by a spacer 125 (FIG. 14) therebetween. The pairs of forward and backward fingers 120 and 123 oppose each other, and the base portions of fingers 120 and 123 where the fingers are attached by shafts 121, 124 have gears meshing with each other. Thus, if the backward fingers 123 are moved around shaft 124, the forward fingers 120 are also moved due to the meshing of the gears 126 such that the fingers 120 and 123 are opened and closed.

Finger arm 110 comprises a U-like cross-section trough 127 in which an actuating member or rod 128 is accommodatable with an end being supported swingably by shaft 124. As shown in FIG. 14, the actuating member or rod 128 supported by shaft 124 has an lower bent end. Spring 129 has one end received by a spring anchor 130 of actuating member 128 such that actuating member 128 is pushed clockwise around shaft 124 and the other end anchored by spacer 125 for the backward fingers 123 such that the actuating member is pushed counterclockwise.

In more detail, if actuating rod 128 is pushed counterclockwise around shaft 124, backward fingers 123 are also moved counterclockwise by the action of spring 129. Therefore, the forward fingers 120 are moved downwardly by gears 126, so that the forward and backward fingers 120 and 123 are closed so as to grip an article or egg.

As shown in FIG. 12, when actuating rod 128 is tilted upwardly, the forward and backward fingers 120 and 123 are open. Actuating rod 128 has a transversal slot 131 extending through a left-hand end portion thereof and having a cross section extending along the actuating member 128. Support shaft 132 is supported parallel to shaft 124 on a lower surface of finger arm 110 below slot 131. U-like control member 133 is supported at lower ends by end portions of support shaft 132 extending from finger arm 110 so as to turn around support shaft 132 relative to finger arm 110. Control member 133 includes U-like base 134, upwardly pointed triangular bottom 135 inclined toward bearing bracket 106 and rectangular protrusion 136 provided at the pointed end of triangular bottom 135. Control member slot 131 receives a pin 137 extending therethrough. A spring 139 is provided on the lower surface of finger arm 110 with ends of the spring anchored on the corresponding spring stops 138 provided on branches of the U-like portion 134 of control member 133 so as to raise control member 133 and finger arm 110. Thus, when control member 133 is turned clockwise around support shaft 132 by the action of spring 139, pin 137 hits on the right-hand end of slot 131 in FIG. 13 and stops. At this time, the actuating member 128 is turned upwardly around shaft 124 to thereby open the forward and backward fingers 120, 123 of finger unit 104.

Arm guide rod 140 is provided along the passageway of distributing conveyer 47 as shown in FIG. 12 such that if finger unit 104 bows from the position (a) of FIG. 12 to the position (b) of FIG. 12, arm guide 140 is gradually lowered from the position (a) to the position (b). Similarly, angle guide rod 141 is provided along the passageway of distributing conveyer 47 such that the rod 141 has a beginning portion at a position where finger unit 104 is situated in the position (b) of FIG. 12 and the rod 141 abuts on angle protrusion 136, and gradually approaches bearing bracket 106 while maintaining its height. Therefore, when distributing conveyer 47 is carried toward you in FIG. 12, protrusion 136 is gradually pushed toward trough 127 of finger arm 110 in groove 119.

In order to rotate the rotational shaft 107 and hence to turn the finger unit 104 from the position (b) shown in FIG. 12 toward you in FIG. 12 or to render finger arm 110 parallel to chain plate 98, lever guide 142 is provided along the passageway of distributing conveyer 47 above rail 96 such that lever guide 142 extends gradually forward from distributing conveyer 47 while maintaining its height. Thus, the rear end of lever 108 is pushed by lever guide 142 at which time lever 108 is turned toward you in FIG. 12 around rotational shaft 107. Simultaneously, finger arm 110 turns while sliding along the lower edge of bearing bracket 106. Finger arm 110 is then engaged with arm stop 116 on bearing bracket 106 and stops at which time the protrusion 136 pushed toward trough 127 of finger arm 110 is also slid together with the finger arm while abutting on the lower edge of bearing bracket 106.

Figure 17:
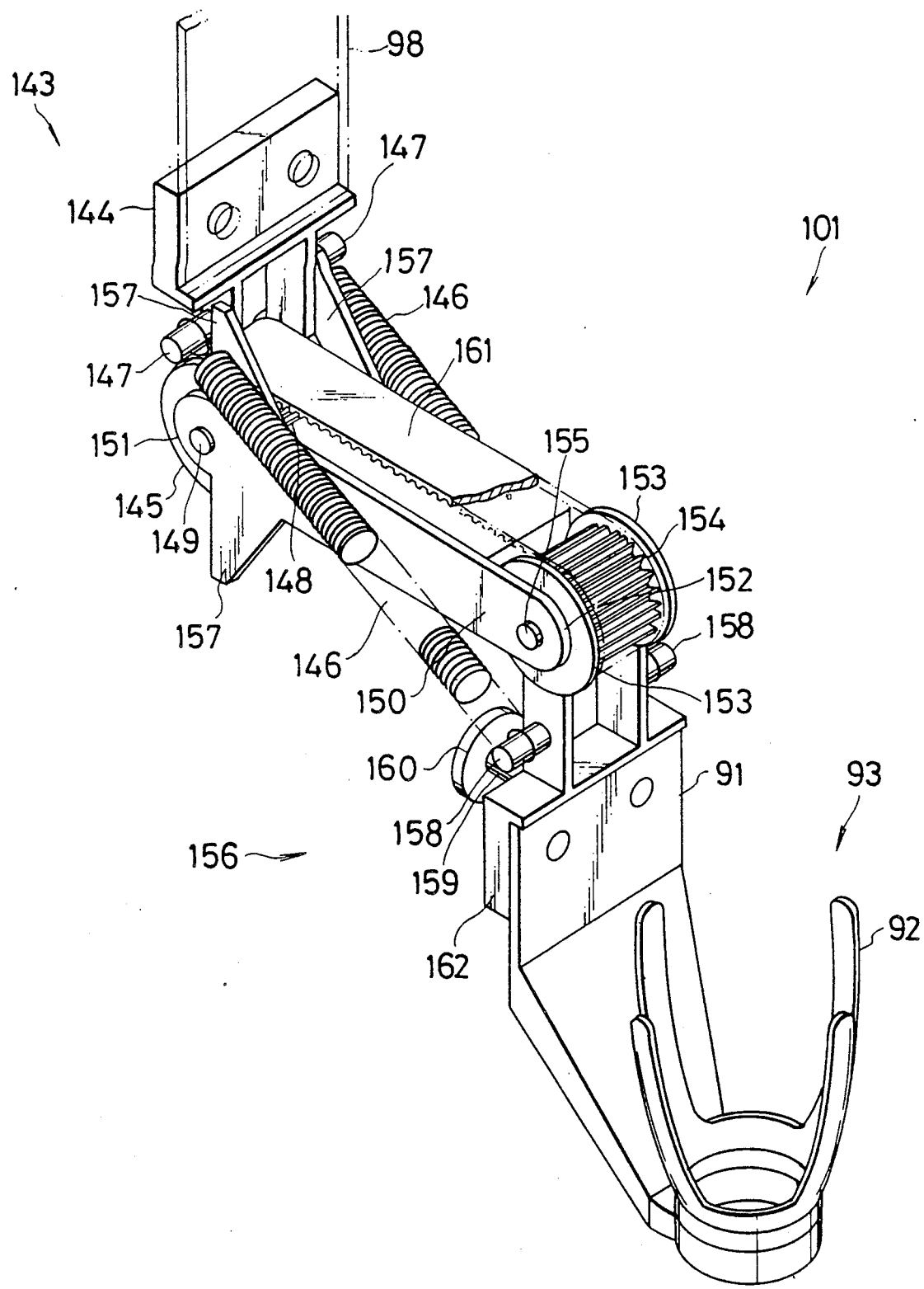
FIG. 17 is a perspective view of a holding unit of the second embodiment.
Figure 18:
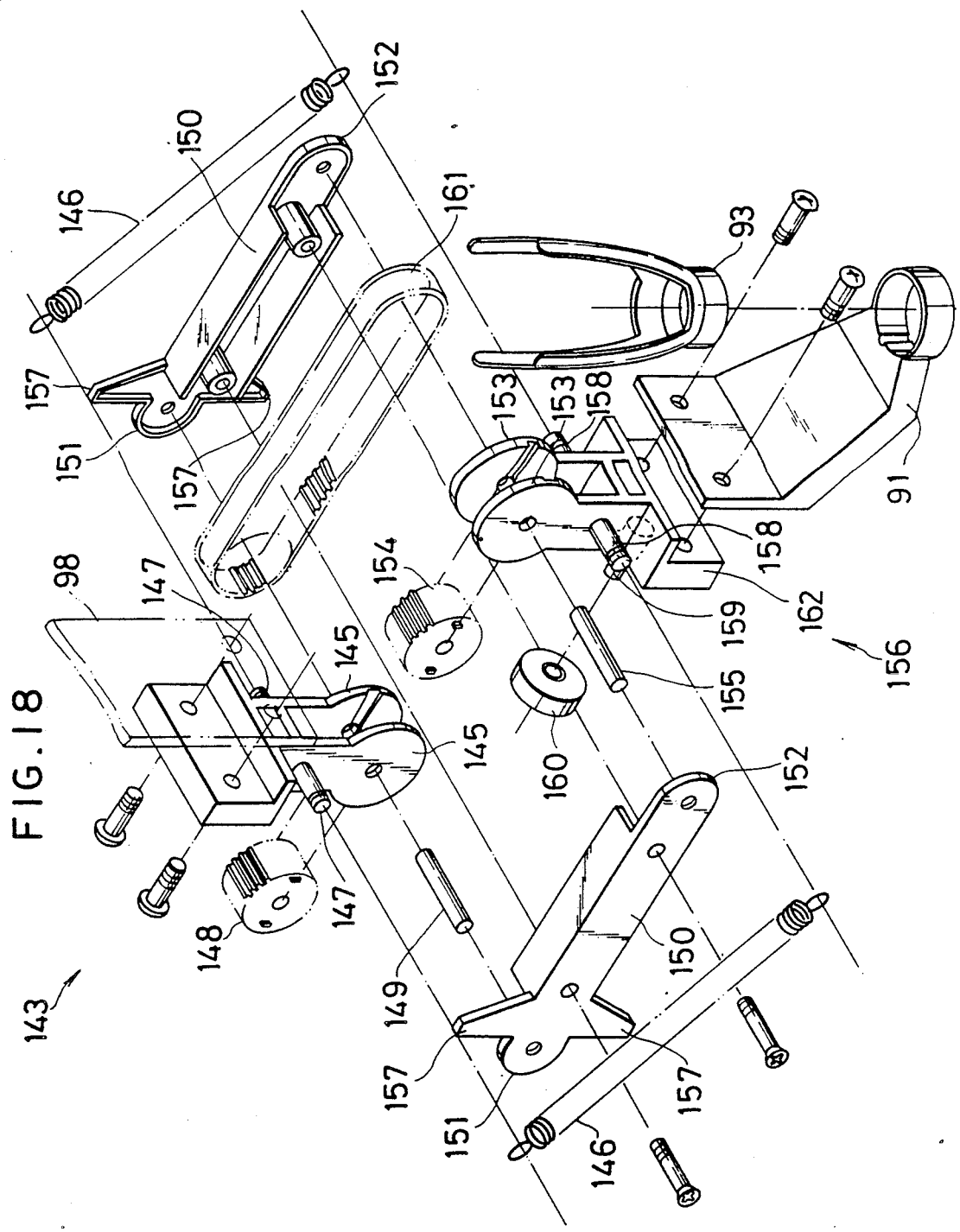
FIG. 18 is an exploded view of the holding unit of FIG. 16.

The holding unit 101 which constitutes a part of carriage 102 will be described with reference to FIGS. 12, 17 and 18. Connector 143 includes an angle-like block 144 fixed conformably to a lower edge of chain plate 98, and a pair of support plates extending downwardly from block 144, each having a circular shaft support end 145. Connector 143 has a pair of outward protrusions 147 to anchor corresponding ends of a pair of springs 146.

The pair of shaft support ends 145 each having a groove on an inner surface thereof support pulley 148 therebetween such that the grooves receive corresponding protrusions provided on each side of pulley 148 with the aid of shaft 149 inserted through pulley 148 and shaft support ends 145. Shaft support ends 145 and pulley 148 are fixed to each other but can turn around shaft 149. A pair of arms 150 hold at one semi-circular end 151 shaft support ends 145 and pulley 148 therebetween and are fixed to shaft 149.

The pair of arms 150 hold at the other semi-circular end 152 shaft support ends 153 and pulley 154 integral with shaft support ends 153 therebetween with the aid of shaft 155. Shaft support ends 153 and pulley 154 are fixed integral with each other, but turnable around shaft 155 which is fixed to semi-circular ends 152. Connector 156 is attached low relative to semi-circular ends 152. Connector 156 has the same members as connector 143.

Each of the pair of semi-circular holding plates 151 which hold bearing supports 145 therebetween has a pair of opposing triangular protrusions 157 each having an outward side extending transversely to arm 150 and through the diameter of semi-circular holding plate 151. The protrusions 157 each extend to a position where it makes contact with rod 147. A pair of springs 146 each has one end anchored to rod 147 of connector 143 and the other end anchored to rod 158 of another connector 156 such that arms 150 are resiliently pressed by connectors 143 and 156 to thereby cause protrusions 157 to protrude perpendicular to chain plate 98 at which position the protrusions 157 abut on rods 147 and stop.

Connector 156 has a roller shaft 159 which extends perpendicular to chain plate 98. Roller 160 supported by roller shaft 159 is guided and conveyed along the guide rail. Thus, the arms 150 are swung back and forth around shaft 149 on the connector 143 side. Endless timing belt 161 extends without slacks around pulleys 148 and 154 which are attached to the respective ends of arms 150.

A substantially L-like cup arm 91 which is the same in type as that of bucket unit 67 is fixed to block 162 of connector 156. Cup 93 which is the same in size as that of bucket unit 67 is fitted into a lower end of cup arm 91.

Figure 19:
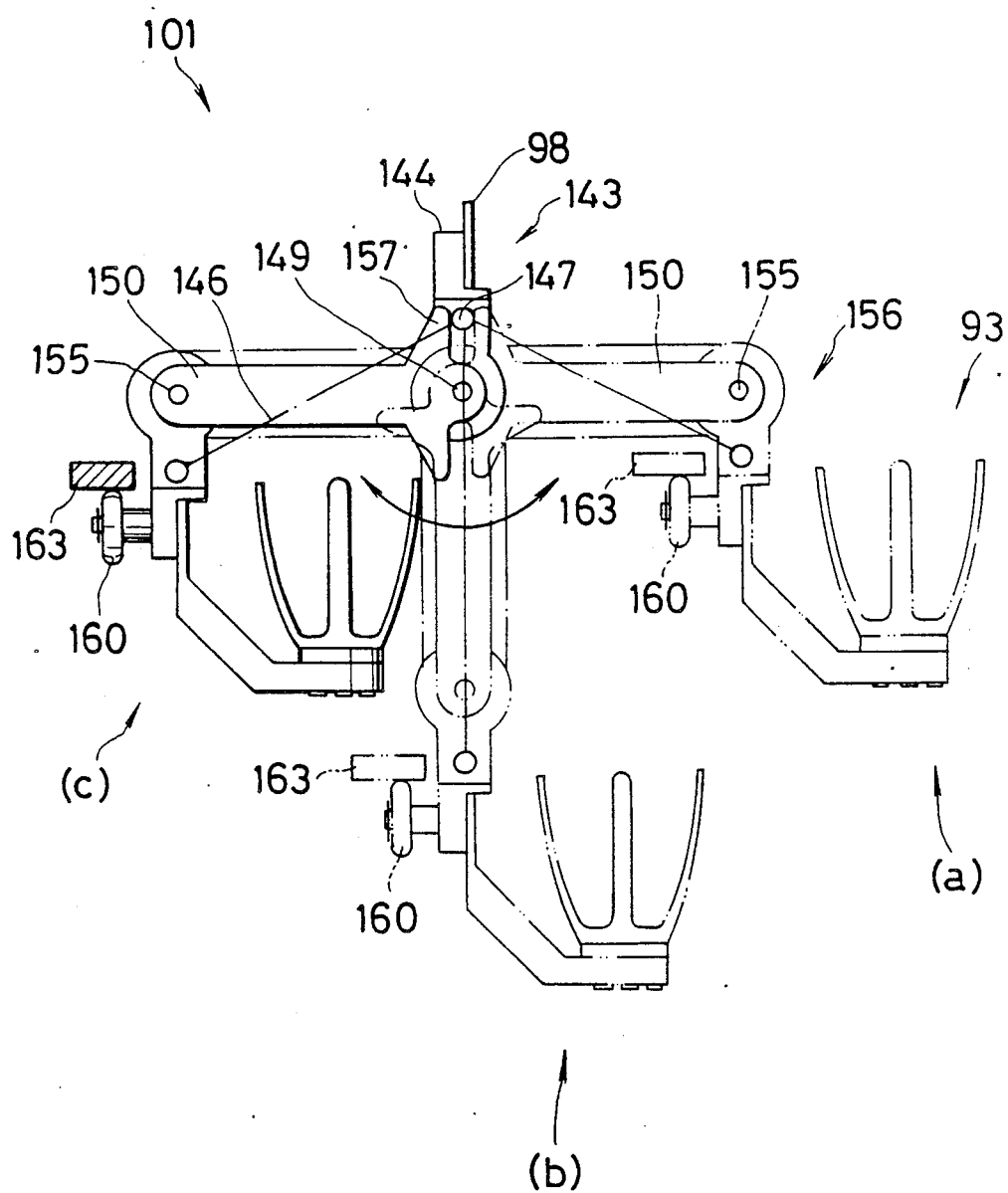
FIG. 19 illustrates the movement of the holding unit.

Pulleys 148, 154 fixed to connectors 143, 156, respectively, and rotatable relative to arms 150 through shafts 149, 155, respectively, and endless timing belt 161 extending around pulleys 148, 154 constitute part of an attitude maintaining means. Thus, if arms 150 are swung back and forth relative to connector 143, irregularities on timing belt 161 are engaged with irregularities on pulleys 148, 154. At this time, pulleys 148, 154 are fixed to connectors 143, 156, so that pulleys 148, 154 are not moved. Thus, cup arm 91 fixed to connector 156 moves back and forth without changing its attitude while drawing a circle (FIG. 19). Thus, cup 93 fixed to cup arm 91 moves while maintaining its pawls 92 in upwardly opening state or maintaining the longitudinal axis of egg 3 vertical.

As shown in FIG. 19, guide rail 163 is provided so as to abut on roller 160 when required. Guide rail 163 includes a wavy plate extending perpendicular to the plane of FIG. 19 in the passageway of distributing conveyer 47. Thus, cup 93 is moved clockwise or counterclockwise drawing a circular arc while maintaining its attitude following the shape of guide rail 163.

FIG. 19(a) shows that arms 150 of holding unit 101 are made rightward horizontal, and that the protrusions 157 of arms 150 abut on rods 147 with the cup 93 opened facing upwardly. At that time, guide rail 163 is below ends of horizontal arms 150. At this time, cup 93 is at a position where egg 3 is shifted. FIG. 19(b) shows arms 150 turned downwardly around shaft 149 so as to be vertical while guide rail 163 lowers gradually from the FIG. 19(a) position to a position below behind vertical arms 150. Roller 160 moves along the wave-like shape of guide rail 163. Even if arms 150 are turned leftward, cup 93 maintains its opening facing upward. FIG. 19(c) shows arms 150 which are further turned leftward to a position where arms 150 have a leftward horizontal attitude and protrusion 157 of arms 150 abut on rods 147. In this case, guide rail 163 rises gradually from the FIG. 19(b) position to a position leftward below arms 150 which has a leftward horizontal attitude. Also, in this case, cup 93 maintains its opening facing upwardly. Namely, even if cup 93 moves rightward or leftward due to the turning of arms 150, it maintains its opening facing upwardly at all times. At this time the cup 93 is at a position where it holds egg 3.

Figure 20:
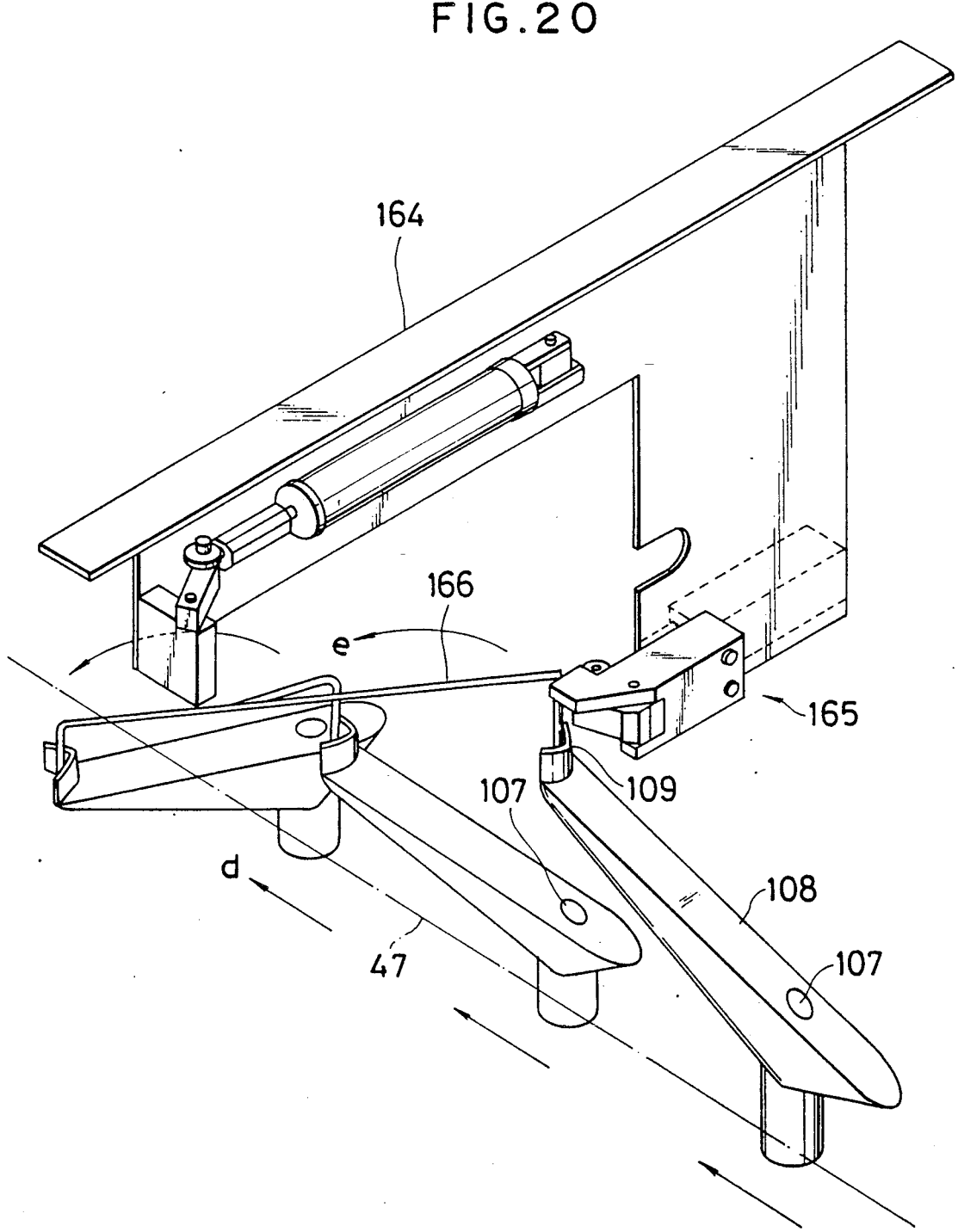
FIG. 20 is schematic perspective view of the first and second discharge stations of the second embodiment.
Figure 21:
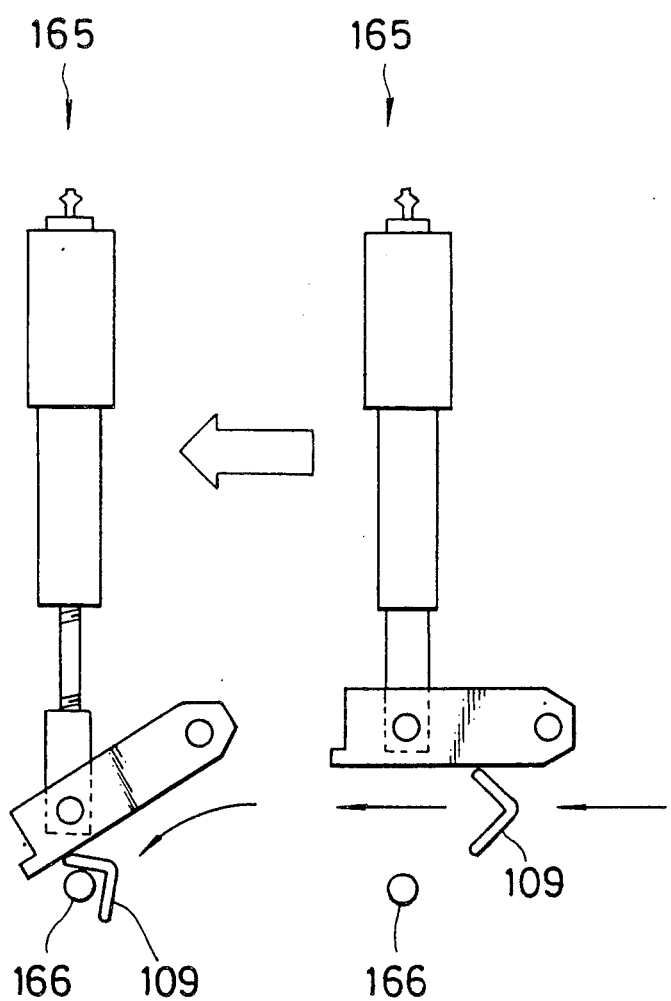
FIG. 21 illustrates the movement of a drive arm pushing mechanism shown in FIG. 20.

A release unit 52 is provided on each of packaging conveyers 50 at each of discharge stations 48, 49 provided in the passageway of distributing conveyer 47. The release unit 52 includes support plates 164 equal in number to the rows of accommodating cancavities in egg pack 51 waiting on packaging conveyer 50. FIG. 20 shows one support plate 164. When carriage 102 is carried with lever 108 parallel to the passageway of distributing conveyer 47, and if egg 3 in discharge unit 100 is to be discharged, control unit (not shown) delivers a discharge signal to drive arm pushing mechanism 165 for support plate 164. As a result, as shown in FIGS. 20 and 21, lever 108 is turned in the direction of arrow e by rotational rod 166 around rotational shaft 107.

The egg selecting and packaging device of the present embodiment operates as follows. In FIG. 7, eggs 3 are conveyed in the direction of arrow a in six rows in order by first feed conveyer 1 with their longitudinal axes horizontal. Eggs 3 are measured by measuring units 4, changed by shift units 43 such that their longitudinal axes are vertical, accelerated and then put into cups 93 of bucket units 67 attached to first bucket conveyer 44 such that the longitudinal axes of eggs are vertical. At this time, cups 93 are at the highest position as shown in FIG. 11(a).

First bucket conveyer 44 is conveyed in the direction of arrow c, bucket units 67 each accommodating egg 3 arrive at first transfer station 58 where the first bucket conveyer 44 is parallel to and moves in the same direction as distributing conveyer 47. At this time, as shown in FIG. 12, finger unit 104 of each discharge unit 100 has raised its head as shown at a in FIG. 12 in the carriage 102 while arms 150 take a horizontal leftward extending attitude in holding unit 101. At first transfer station 58, finger arms 110 abut at an end on arm guide rod 140 inclined downwardly toward you in FIG. 12. Thus, finger unit 104 gradually bows as distributing conveyer 47 is conveyed in the direction of arrow d. Since it is arranged such that roller 89 is pushed down by guide rail 94 as first bucket conveyer 44 is conveyed in the direction of arrow c (FIG. 11), cup 93 which is at the highest position at this time is temporarily lowered and finger unit 104 bows to the postion (b) in FIG. 12 and cup 93 rises again to the highest position. Thus, fingers 120, 123 of finger unit 104 do not hit on cup pawls 92 to thereby allow only egg 3 to be gripped. In more detail, angle guide rod 141 is provided such that it approaches distributing conveyer 47 while maintaining its height from the position where finger unit 104 bows. As distributing conveyer 47 is conveyed in the direction of arrow d, angle protrusion 136 is pressed toward distributing conveyer 47. Thus, pin 137 slides leftward in slot 131 and actuating member 128 is pressed downward around shaft 124. Thus, an end of actuating member 128 engaged with spacer 125 (FIG. 14) for backward fingers 123 turns rightward around shaft 124. Simultaneously, spacer 125 moves such that the backward fingers 123 are closed by the action of spring 129. Simultaneously, the forward fingers 120 are also moved so as to close by the meshing of gears 126. As a result, egg 3 accommodated in cup 93 is held by forward and backward fingers 120, 123 at which time bucket unit 67 is pressed down by guide rail 94 from the FIG. 11(a) state to FIG. 11(b) state so as not to hinder the conveyance of discharge units 100.

As described above, at first transfer station 58, arm guide rod 140 is provided inclined downwardly toward you in FIG. 12. The angle guide rod 141 is provided so as to maintain its height while extending gradually leftward in FIG. 12. Guide rail 94 is provided in the form of a wave.

Figure 22:
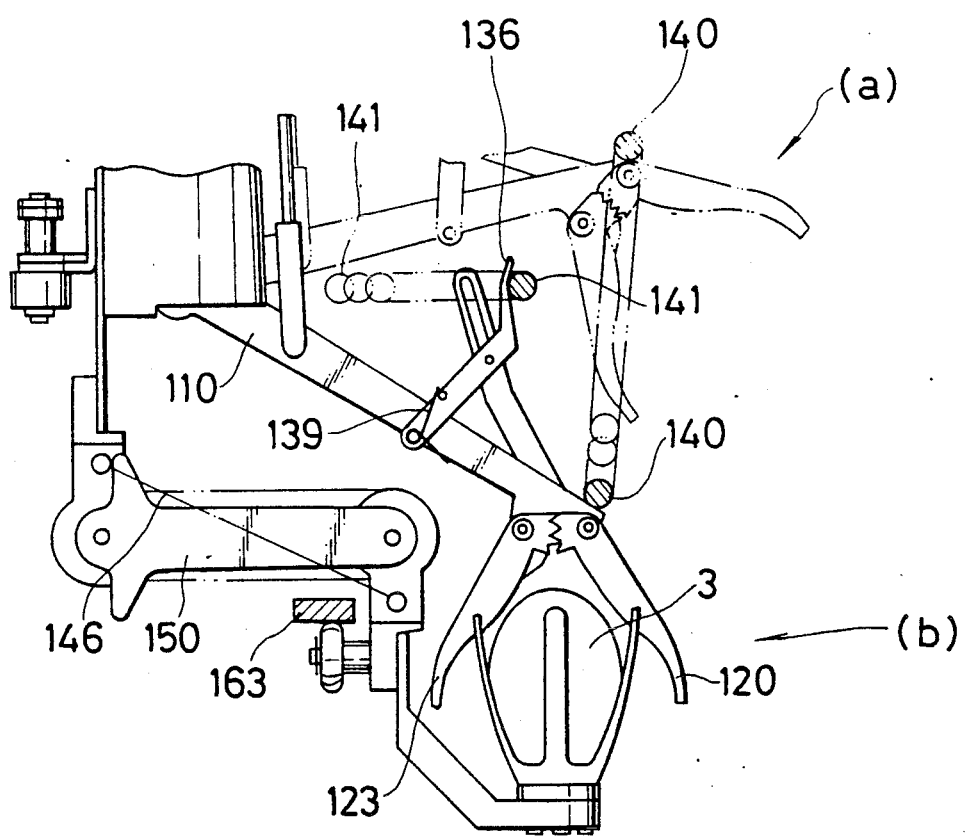
FIG. 22 is a side view of the first and second transfer stations of the second embodiment.

First transfer station 167 is in the passageway of distributing conveyer 47 from first transfer station 58 to second transfer station 59. If finger unit 104 is carried to transfer station 167 while gripping egg 3 as mentioned above, cup 93 of holding unit 101 is moved in accordance with the shape of guide rail 163 from the FIG. 19(c) holding position through the FIG. 19(b) position to the FIG. 19(a) shift position to thereby position the cup 93 rightward. An empty cup 93 rises rightward so as to receive egg 3 held by finger unit 104. As shown in FIG. 22, an end of finger arm 110 is pressed by arm guide rod 140 while angle guide rod 141 maintains its height and extends gradually rightward. Angle protrusion 136 moves in the direction d of conveyance of conveyer 47 along angle guide rod 141. Thus, angle protrusion 136 is released from its pressed state and thus returned rightward by the action of spring 139 to thereby release egg 3 held by the forward and backward fingers 120, 123 into cup 93 of holding unit 101. Arm guide rod 140 and angle guide rod 141 extend to a position where egg 3 is held by holding unit 101. Therefore, when arm guide rod 140 and angle guide rod 141 then disappear, finger unit 104 is bounded up by air damper 117 to take an attitude as shown at (a) in FIG. 12 in which finger unit 104 raises its head. Guide rail 163 starts at this position and extends from the shift position (a) of FIG. 19 through the position (b) of FIG. 19 to the holding position (c) of FIG. 19. As mentioned above, in the first transfer station 167, arm guide rod 140 and angle guide rod 141 continue to extend from first transfer station 58. Guide rail 163 is provided so as to extend from a position where arm guide rod 140 and angle guide rod 141 disappear.

As shown in FIG. 7, eggs 3 are carried in six rows in order in the direction of arrow a from second feed conveyer 2 with the longitudinal axes of eggs 3 kept horizontal. Eggs 3 are measured by measuring units 4 and then changed by shift unit 43 such that their longitudinal axes are vertical, accelerated and put into cups 93 of buckets 67 attached on second bucket conveyer 46 with their longitudinal axes vertical. At this time, the cup 57 is at the highest position as shown in FIG. 11(a).

Second bucket conveyer 46 is also carried in the direction of arrow d like distributing conveyer 47. At second transfer station 59, bucket unit 67 which accommodates eggs 3 is at a position where the passageways of second bucket conveyer 46 and distributing conveyer 47 overlap in a vertical plane. Thus, at second transfer station 59, second bucket conveyer 46 is in the same state as first bucket conveyer 44 and bucket units 67 below distributing conveyer 47. The bucket 67 is the same in direction as the finger unit 104. Namely, finger unit 104 and bucket unit 67 face in the same direction. Also, at second transfer station 59, the manner in which finger unit 104 grips egg 3 is the same as that at first transfer station 58. Also, in second transfer station 59, arm guide rod 140 and angle guide rod 141 are provided so as to have the same shape. Before arm guide rod 140 and angle guide rod 141 disappear, lever guide 142 is provided so as to extend gradually rightward from the position shown in FIG. 12 in the direction of conveyance. Thus, when finger unit 104 grips egg 3 at second transfer station 59, lever 108 turns toward you in FIG. 12 around shaft 107 with the finger unit 104 a head of which is lowered as shown at (b) in FIG. 12. At this time, finger arm 110 slides on the lower edge of bearing bracket 106 and is stopped by engaging arm stop 116. Guide rail 94 is provided in the form of a wave so as to extend from the FIG. 11(a) state to the FIG. 11(b) state. Before finger unit 104 turns, bucket unit 67 is pressed down. At this time, angle protrusion 136 stops abutting on the lower edge of bracket 106 and egg 3 is kept held by the fingers 120, 123. Lever guide 142 is provided so as to gradually extend rightward in the direction of conveyance until such state results. When finger arm 110 is engaged with arm stop 116, finger 104 faces in the direction of conveyance or arrow d so as to be parallel to the direction of conveyance. Thus, as shown in FIG. 20, lever 108 also faces so as to be parallel to the direction of conveyance.

Figure 16A:
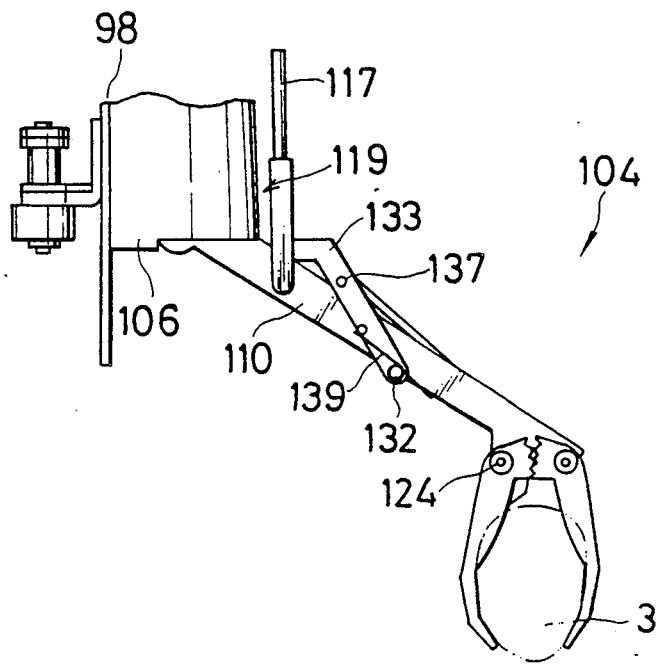
FIGS. 16(a), (b), (c) illustrate the operation of the charge unit of FIG. 13.
Figure 16B:
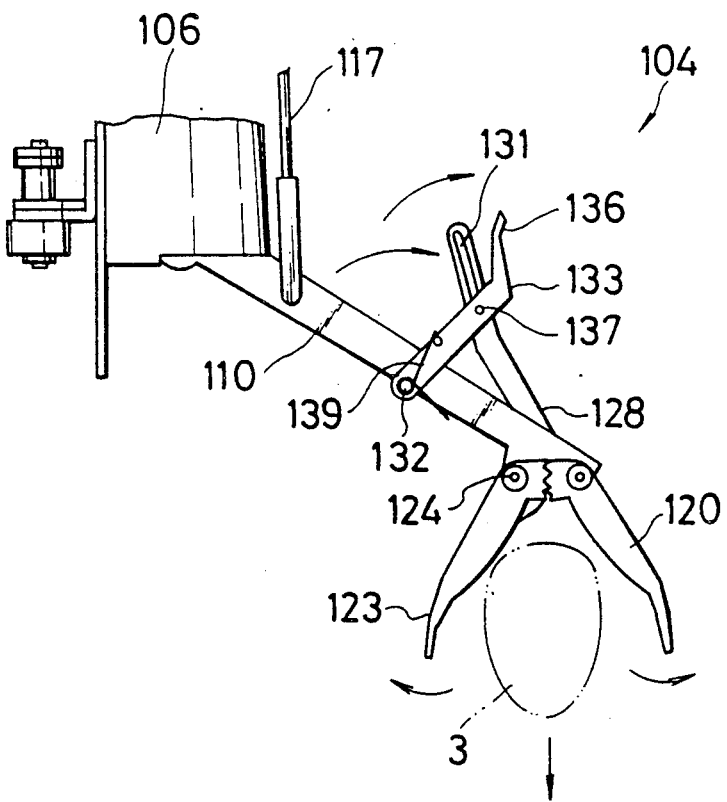
Figure 16C:
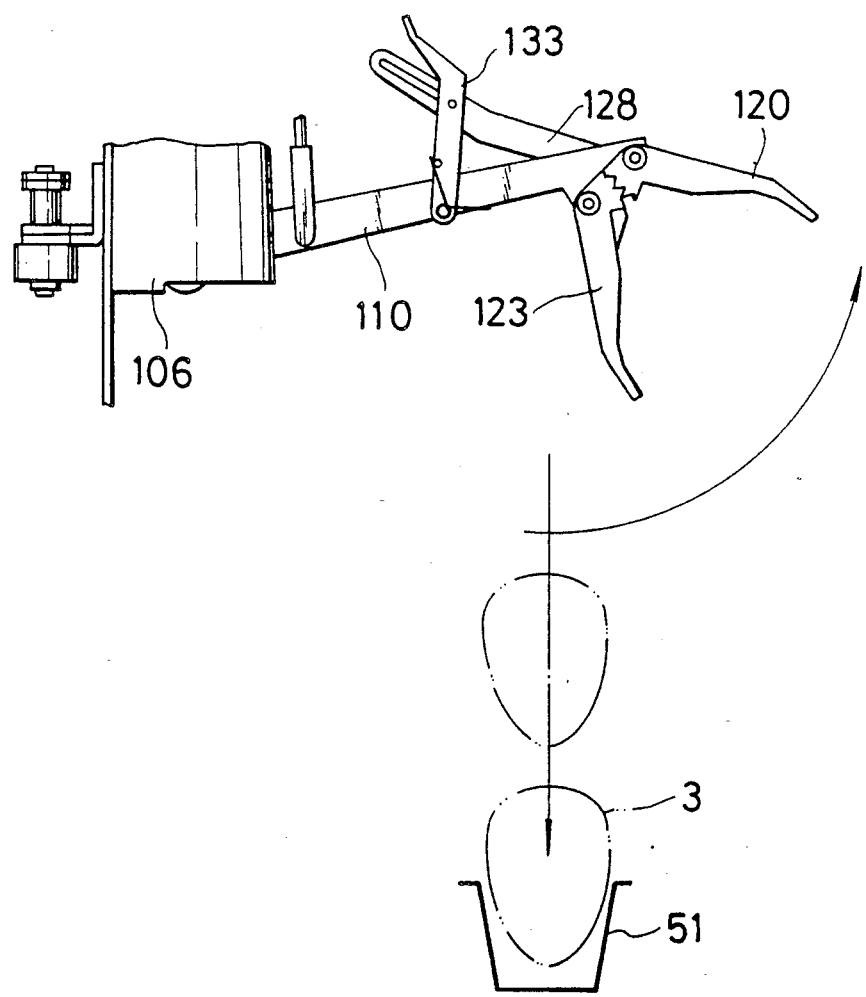

Carriage 102 having discharge unit 100 and holding unit 101 is carried in the direction of arrow d while maintaining its state, mentioned above, to first discharge station 48 where release device 52 is provided in the passageway of distributing conveyer 47. When a release signal is input to support plate 164 of release device 52, drive arm pushing mechanism 165 is actuated, engaging member 109 of lever 108 is guided by drive arm pushing mechanism 165 and engaged with a vertical bent end of turning rod 166. Since carriage 30 is carried in the direction of arrow d, lever 108 is turned in the direction of arrow e by turning rod 166 around rotational shaft 107. Thus, as shown in FIG. 16(b), finger unit 104 is returned to the position of groove 119 in bearing bracket 106 so as to perpendicular to chain plate 98. Arm guide rod 140 and angle guide rod 141 are not provided at first discharge station 48. Therefore, if finger unit 104 is returned to groove 119 in bearing bracket 106, angle protrusion 136 is released from the lower edge of bearing bracket 106 as shown in FIG. 16(b). At this time, finger arm 110 abuts on the edge of bearing bracket 106, so that finger arm 110 abuts on the lower edge of bearing bracket 106 while only control member 133 is raised clockwise by spring 139. When control member 133 is turned clockwise around support shaft 132, pin 137 inserted in slot 131 moves, so that actuating member 128 rises around shaft 124. As a result, the forward and backward fingers 120, 123 are opened to thereby release egg 3 held therein. The egg 3 then falls by gravity in the air. At this time, the backward fingers 123 will bound to again close around shaft 124 due to the reaction of opening. However, this is hindered by pin 137 inserted in slot 131 in actuating member 128 supported by shaft 124. Namely, the forward and backward fingers 120, 123 open only once and do not push released egg 3, so that the released egg 3 is put into egg pack 51 waiting downward on packaging conveyer 50. After egg 3 is put into the egg pack, finger unit 104 takes the state of FIG. 16(c) by the tension of air damper 117.

At first discharge station 48, all the eggs 3 held by finger units 104 of respective discharge units 100 are put into egg pack 51. Thus, in the carriages 102 which have passed through discharge station 48, each discharge unit 100 has finger unit 104 facing rightward so as to be perpendicular to the passageway of distributing conveyer 47 as shown at (a) in FIG. 12. Finger arm 110 is engaged in the groove 119 in bearing bracket 106. The holding unit 101 is in a position where arm 150 has been leftward rotated so as to be horizontal as shown at (c) in FIG. 19.

Second shift station 168 is in the passageway of distributing conveyer 47 between first and second discharge stations 48 and 49. In the second transfer station 168, egg 3 held by holding unit 101 is transferred to discharge unit 100. Guide rail 163 is at a leftward position below the arm 150 which is leftward rotated so as to be horizontal, as shown at (c) in FIG. 19, gradually lowers rightward to the lowest position (b) of FIG. 19, and hence rises to the position which is leftward below the end of arm 150 turned to the rightward position so as to be horizontal as shown at (a) in FIG. 19. Guide rail 163 again lowers gradually leftward from the position (a) of FIG. 19 to the lowest position (b) of FIG. 19 and then rises leftward to the position (c) of FIG. 19. Since these positions FIGS. 19 (a), (b), (c) are spaced in the direction of conveyance, cup 93 is carried in the direction of arrow d or conveyance while moving to the position (a) of FIG. 19 through the position (b) of FIG. 19 from the position (c) of FIG. 19. Arm guide rod 140 and angle guide rod 141 are provided parallel to guide rail 163, as shown in FIG. 22. The guide rods 140, 141 have the same shape as those at second transfer station 59, and the operation of finger unit 104 and the operation of gripping eggs 3 held in cup 93 of holding unit 101 are the same as those performed at second transfer station 59.

Figure 23:
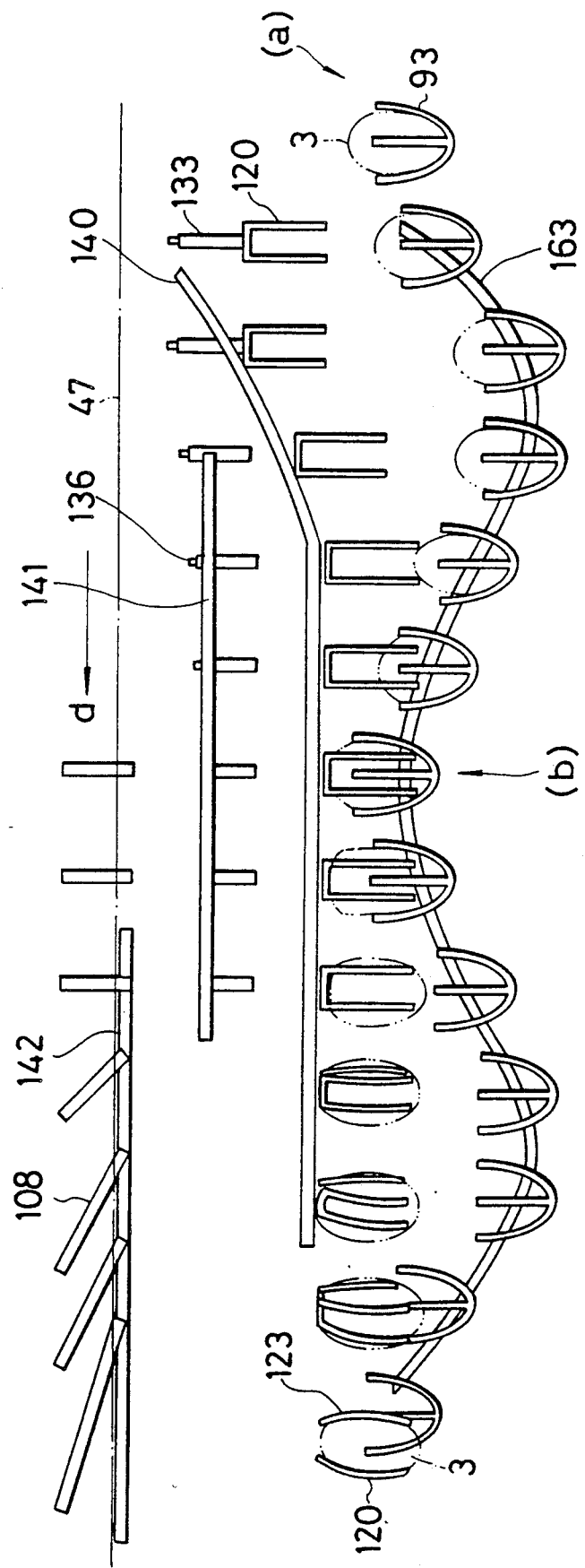
FIG. 23 is a front view of a guide rod in the first and second interchange stations of FIG. 22.
Figure 24:
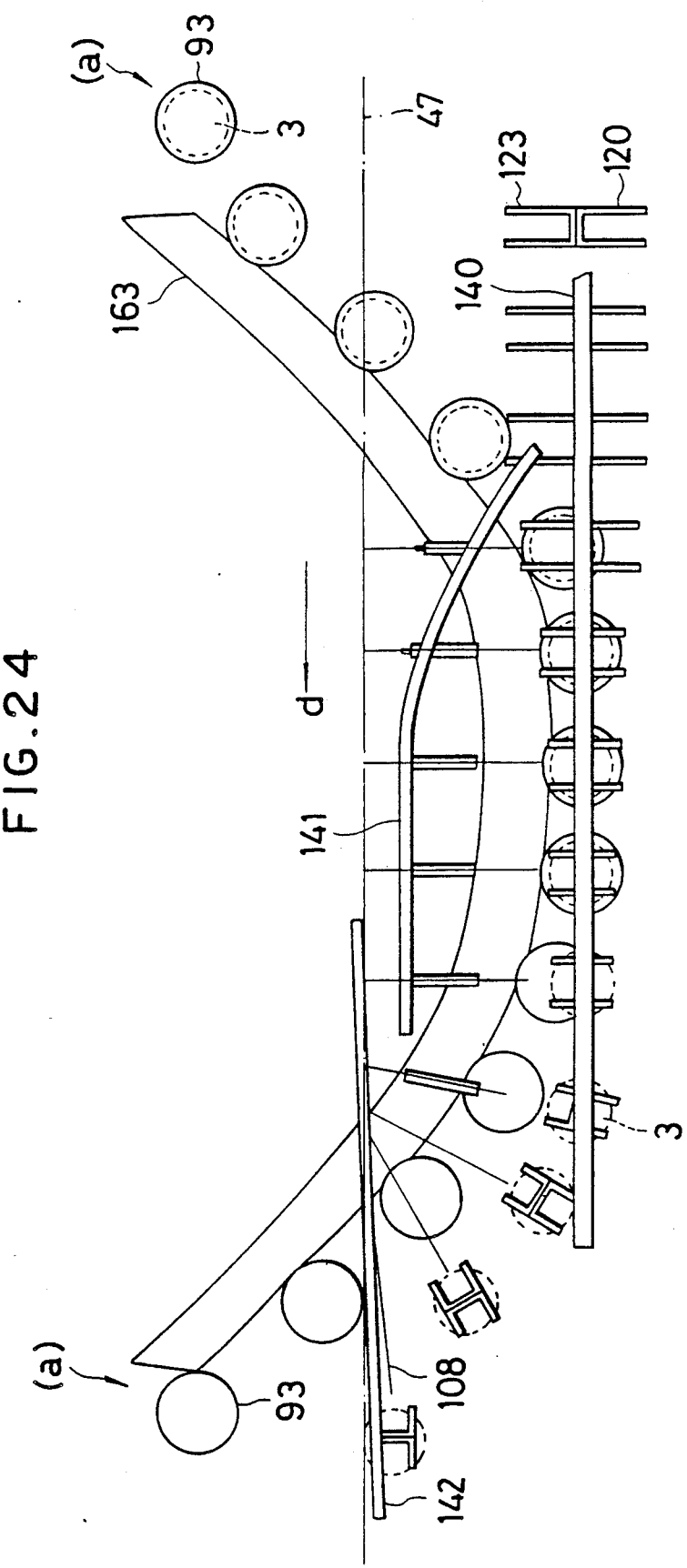
FIG. 24 is a plan view of the guide rod shown in FIG. 23.

This operation will be described by showing the shape of the guide rods with reference to FIGS. 23, 24. At second transfer station 168, arm guide rod 140 which gradually pushes down finger unit 104 of discharge unit 100 by the conveyance of distributing conveyer 47 maintains the distance between rod 140 and the passageway of distributing conveyer 47, lowers gradually in the direction of arrow d to the position (b) where egg 3 in cup 93 is gripped or transferred and then extends horizontally. In order to simultaneously position cup 93 of holding unit 101 which holds egg 3 at the shift position (b) by moving it forwardly while lowering it gradually from leftward holding unit 101 or from the FIG. 19(c) position, guide rail 163 is positioned below arm guide rod 140. Guide rail 163 extends from leftward to rightward with respect to the passageway of the conveyer 47 to intersect with the same. At this shift position, cup 93 takes the lowest position. Namely, cup 93 takes the FIG. 19(b) state, moves to the right side of the conveyer passageway, rises then to the shift position (b) or the FIG. 19(a) position while it is drawing a wavy arc. Angle guide rod 141 is provided above arm guide rod 140 so as to start after the starting point of arm guide rod 140 and guide rail 163. Angle guide rod 141 maintains the same height while extending so as to gradually approach the passageway of distributing conveyer 47, approaches the conveyer passageway the most before transfer position (b) where the angle protrusion 136 is pressed down by angle guide rod 141 into trough 127 of finger arm 110. Thus, the forward and backward fingers 120, 123 of finger unit 104 grip the egg in cup 93. The angle guide rod 141 is shorter than arm guide rod 140 and guide rail 163. Lever guide 142 is provided at the same position as the passageway of distributing conveyer 47 and higher than angle guide 141 before angle guide rod 141 disappears. At this position, finger unit 104 already grips egg 3. Linear lever guide 142 extends rightward gradually while maintaining the same height such that finger unit 104 which grips egg 3 is caused to face the direction of conveyance or arrow d and parallel to the passageway of distributing conveyer 47.

The guides are provided, as mentioned above, at second shift station 168. Thus, when holding unit 101 moves along the shape of guide rail 163 from the holding position (a) to the shift position (b), finger unit 104 gradually bows along the shape of arm guide 140. At shift station (b), forward and backward fingers 120, 123 are positioned so as to open and cover egg 3 in cup 93. When angle protrusion 136 is pressed by angle guide 141, egg 3 is gripped by fingers 120, 123. The finger unit 104 which grips egg 3 faces the direction of conveyance of distributing conveyer 47 when lever 108 is turned by lever guide 142 toward the passageway of distributing conveyer 47 to thereby carry gripped eggs 3. Holding unit 101 having an empty cup 93 lowers to the lowest position where it intersects with the conveyer passageway so as not to hinder the conveyance of discharge unit 100, rises and positions cup 93 at the holding position (a).

The carriage 102 which has passed through second shift station 168 directs finger unit 104 of discharge unit 100 which grips egg 3 in the direction of conveyance of distributing conveyer 47. In this state, the cup 93 of the holding unit 101 is empty and the finger arm is rotated leftward. The holding unit then moves to second discharge station 49 while maintaining such state.

At second discharge station 49, the same operation as that performed at first discharge station 48 is performed to thereby put egg 3 into egg pack 51 waiting on packaging conveyer 50. Carriage 102 which has passed through second discharge station 49 moves to first transfer station 58 to select and package eggs again in the same state as that assumed when carriage 102 has passed through first discharge station 48.

While the present embodiment is disclosed as being directed to the egg selecting and packaging device, it is to be noted that the present invention is not limited to it, of course.

While in the present embodiment the discharge unit is constituted so as to grip an article and the holding unit is constituted so as to support an article, the discharge unit is only required to discharge an article. Alternatively, it may be constituted so as to support an article. The holding unit is only required to hold an article during conveyance. Alternatively, it may be constituted so as to grip an article during conveyance.

While in the present embodiment an article on the second feed conveyer is described as being held by the bucket conveyer and transferred to the discharge unit for discharging purposes, the bucket conveyer is not necessarily required and an article may be gripped directly by the discharge unit or by other means.

What is claimed is:

1. An article conveying method in which articles are held by a carriage provided on an endless recirculating distributing conveyer and discharged at a discharge station positioned in the passageway of the conveyer, the carriage including a discharge unit for discharging an article at the discharge station and a holding unit for holding another article until the discharge unit discharges the article, comprising the steps of:
   shifting the another article held by the holding unit to the discharge unit during a time when the carriage is carried to a next discharge station after the discharge unit discharges the article at the first discharge station to discharge the another article at the next discharge station.

2. A carriage used for an article conveying method according to claim 1, comprising:
   discharge unit provided swingably on a plate fixed to a recirculating chain and having a gripping unit at an end thereof; and
   a holding unit having an arm turnable from a first position to a second position along a guide passageway, the arm being pivoted at one end thereof to a lower end of the plate, a holding element provided at the other end of the arm such that an opening in the holding element faces upwardly at all times,
   whereby when the holding element of the holding unit moves to the first position, the discharge unit turns downwardly to causes the gripping unit to grip the article held by the holding element of the holding unit.

3. An article conveying apparatus using the carriage of claim 2, comprising:
   a first and a second feed conveyer for feeding articles;
   a distributing conveyer having the carriage including a plurality of discharge units disposed at equal intervals on the side of an endless recirculating chain disposed before the first feed conveyer so as to traverse the same, the discharge unit having a gripping unit for gripping an article at an end of a vertically movable arm, and a holding unit provided below each discharge unit and having a holding element at an end of an arm movable to one and the other side of a guide passageway such that an opening in the holding element faces upwardly at all times; and a plurality of packaging conveyers provided halfway through the passageway of the distributing conveyer.

4. An article conveying apparatus using the carriage of claim 2, comprising:
a first and a second feed conveyer for feeding an article;
a distributing conveyer having the carriage including a plurality of discharge unit disposed at equal intervals on the side of an endless recirculating chain disposed before the first feed conveyer so as to traverse the same, the discharge unit having a gripping unit for gripping an article at an end of a vertically movable arm, and a holding unit provided below each discharge unit and having a holding element at an end of an arm movable to one and the other side of a guide passageway such that an opening in the holding element faces upwardly at all times;
a recirculating conveyer provided on the side of an endless recirculating chain disposed before the second feed conveyer so as to traverse same and overlapping with the passageway of the distributing conveyer, the recirculating conveyer including an arm a free end portion of which is movable vertically and has a holding unit; and
a plurality of packaging conveyers provided halfway through the passageway of the distributing conveyer.

5. In a selector for selecting articles held by a distributing conveyer halfway through a passageway of the distributing conveyer according to a physical characteristic of the articles, an article conveying apparatus comprising:
a first recirculating conveyer for conveying a first article fed by a feed unit;
a second recirculating conveyer for conveying a second article fed by a second feed unit; and
an endless recirculating distributing conveyer having a portion parallel and adjacent to respective passageways of the first and second recirculating conveyers,
the distributing conveyer including a carriage which includes a discharge unit for discharging the first and second articles and a holding unit for holding the first article until the discharge unit discharges the second article.

6. In a selector for selecting articles held by a distributing conveyer halfway through a passageway of the distributing conveyer according to a physical characteristic of the articles, an article conveying apparatus comprising:
a first recirculating conveyer for conveying a first article fed by a feed unit;
a second recirculating conveyer for conveying a second article fed by a second feed unit;
an endless recirculating distributing conveyer having a portion parallel and adjacent to respective passageways of the first and second recirculating conveyers, and
the distributing conveyer including a carriage which includes a discharge unit for discharging the first and second articles and a holding unit for holding the first article until the discharge unit discharges the second article; whereby the first article held by the holding unit is transferred to the discharge unit after the discharge unit discharges the second article at a first discharge station during the time when the carriage is conveyed to a next discharge station in order to discharge the first article at the next discharge station.

7. An article conveying apparatus comprising
a carriage including means for discharging a first article at a discharge station and means for holding a second article until the discharging means discharges the first article, the discharge station being positioned in a passageway of an endless recirculating distributing conveyer;
the holding means including first connecting means for connecting to the distributing conveyer, second connecting means for connecting an accommodating unit having an opening facing upwardly and holding an article therein, an arm having one end at which the first connecting means is provided turnably and the other end at which the second connecting means is provided turnably, and attitude maintaining means for maintaining the opening of the accommodating unit so as to face upwardly at all times when the arm turns around the first connecting means,
the accommodating unit being positioned at a position for holding an article when the arm is turned around the first connecting means away from an article shift position to take a substantially horizontal attitude and at the article shifting position when the arm is turned around the first connecting means away from the article holding position to take a substantially horizontal attitude.

8. A degripping apparatus comprising:
an attaching member fixed to an endless recirculating traveling conveyor;
a rotational shaft supported on the attaching member;
a gripping arm pivoted on the rotational shaft, extending in a direction where the arm intersects with the rotational shaft, the gripping arm being turned in accordance with the rotation of the rotational shaft;
an article gripping mechanism provided on one end of the gripping arm, and including a pair of opposing gripping members provided pivotally on the one end of the gripping arm, the gripping members having connecting portions meshing with each other, whereby when one of the gripping members is turned, the other gripping member is also turned so that the gripping members open and close;
a drive arm fixed to the rotational shaft, extending in the direction where the drive arm intersects with the rotational shaft, having engaging means at one end thereof and rotating the rotational shaft by the turning of the drive arm, whereby when the gripping arm is turned by means of the rotation of the rotational shaft from a position where the gripping arm is parallel to the direction of movement of the traveling means to a position where the gripping arm is perpendicular to the direction of movement of the traveling means, the gripping mechanism degrips the article;
an actuating member provided pivotally on one end of the gripping arm, and having one end engaged with one opposing gripping member to turn said one opposing gripping member; and a control member for actuating the actuating member, having a control member provided pivotally on the gripping arm at one end thereof and spring means for elastically urging the actuating member against the gripping arm in a direction which brings the gripping members into an opened state.

9. A degripping apparatus according to claim 8, in which the control member has an engaging portion engaged with the actuating member to limit freely pivotal movement of the actuating member, so that the control member inhibits the gripping members from re-closing when the gripping members degrip the article.

10. A degripping apparatus according to claim 8, which further comprises:
a second spring means provided on the gripping arm, one end of said second spring means being engaged with the actuating member, other end of said second spring means being engaged with said one gripping member, so that the gripping members grip the article elastically.

* * * * *